(12) United States Patent
Parshin et al.

(10) Patent No.: US 11,240,630 B2
(45) Date of Patent: *Feb. 1, 2022

(54) TIME-RESTRICTED LOCATION-BASED SERVICE ZONE MANAGEMENT

(71) Applicant: Amazon Technologies, Inc., Seattle, WA (US)

(72) Inventors: Sergey Parshin, Redcliffe (AU); Jon Robert Ducrou, West End (AU); Ryan Hapgood, Belmont (AU); Qiwei Liu, Santa Clara, CA (US); Raymond Smith, Kelvin Grove (AU); James Michael Sutula, San Francisco, CA (US); Benjamin Winters, Brisbaine (AU)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,099

(22) Filed: Jun. 24, 2020

(65) Prior Publication Data

US 2020/0329335 A1    Oct. 15, 2020

Related U.S. Application Data

(63) Continuation of application No. 15/601,533, filed on May 22, 2017.

(51) Int. Cl.
*H04W 4/021* (2018.01)
*H04W 4/02* (2018.01)
(Continued)

(52) U.S. Cl.
CPC .......... *H04W 4/021* (2013.01); *H04B 7/0417* (2013.01); *H04B 7/0619* (2013.01);
(Continued)

(58) Field of Classification Search
CPC ..... H04W 4/021; H04W 4/023; H04W 4/025; H04W 16/14; H04W 14/18; B64C 39/024; H04B 7/0619
See application file for complete search history.

(56) References Cited

U.S. PATENT DOCUMENTS 7,983,691 B1    7/2011    Wong et al.
8,838,751 B1    9/2014    Scofield et al.
(Continued)

FOREIGN PATENT DOCUMENTS

EP    3025527 A2    6/2016

OTHER PUBLICATIONS

U.S. Appl. No. 15/670,441 filed on 08/0712017, Final Office Action dated Mar. 13, 2019.
(Continued)

*Primary Examiner* — Fred A Casca
(74) *Attorney, Agent, or Firm* — Thomas | Horstemeyer, LLP

(57) ABSTRACT

Disclosed are various embodiments for managing location-based service zones that are active during limited time periods. A notification of a trigger event relating to a location-based time zone can be received. The time the notification is received can be compared to time window that the location-based service zone is active. A notification of the trigger event is sent to a respective provider associated with the location-based service zone when the location-based service zone is active.

20 Claims, 10 Drawing Sheets

(51) Int. Cl.
*H04B 7/06* (2006.01)
*H04B 7/0417* (2017.01)
*H04W 16/14* (2009.01)
*H04W 16/18* (2009.01)

(52) U.S. Cl.
CPC .......... *H04W 4/023* (2013.01); *H04W 4/025* (2013.01); *H04W 16/14* (2013.01); *H04W 16/18* (2013.01)

(56) References Cited

U.S. PATENT DOCUMENTS

| | | | |
|---|---|---|---|
| 9,258,677 | B2 | 2/2016 | Saha et al. |
| 9,503,860 | B1 | 11/2016 | Mankovskii et al. |
| 9,648,581 | B1 | 5/2017 | Vaynblat et al. |
| 9,651,673 | B2 | 5/2017 | Lacatus |
| 9,736,636 | B1 * | 8/2017 | DeLuca ............... H04W 4/023 |
| 9,749,206 | B2 | 8/2017 | Levien |
| 9,749,794 | B2 | 8/2017 | Saha |
| 9,948,492 | B2 | 4/2018 | Jung et al. |
| 10,057,412 | B1 | 8/2018 | Salour et al. |
| 10,104,605 | B1 | 10/2018 | Parshin et al. |
| 10,122,682 | B1 | 11/2018 | Salour et al. |
| 10,123,163 | B2 | 11/2018 | Kernan |
| 10,129,694 | B1 | 11/2018 | Parshin et al. |
| 2008/0174485 | A1 | 7/2008 | Carani et al. |
| 2009/0006211 | A1 | 1/2009 | Perry et al. |
| 2009/0268652 | A1 | 10/2009 | Kneckt |
| 2011/0153428 | A1 | 6/2011 | Ramer et al. |
| 2012/0001938 | A1 | 1/2012 | Sandberg |
| 2012/0309413 | A1 | 12/2012 | Grosman et al. |
| 2013/0267253 | A1 * | 10/2013 | Case ................ H04W 4/021 455/456.3 |
| 2013/0304576 | A1 | 11/2013 | Berland et al. |
| 2013/0310053 | A1 | 11/2013 | Srivastava et al. |
| 2014/0045521 | A1 | 2/2014 | Grainger et al. |
| 2014/0058815 | A1 | 2/2014 | Hiremath et al. |
| 2014/0162692 | A1 * | 6/2014 | Li ..................... H04L 67/306 455/456.3 |
| 2014/0164118 | A1 | 6/2014 | Polachi |
| 2014/0297555 | A1 * | 10/2014 | Kawano ............ G06Q 10/0837 705/340 |
| 2014/0370909 | A1 | 12/2014 | Natucci, Jr. et al. |
| 2015/0024773 | A1 | 1/2015 | Li et al. |
| 2015/0036657 | A1 * | 2/2015 | Hong .................... H04W 36/32 370/331 |
| 2015/0094097 | A1 | 4/2015 | Fraccaroli |
| 2015/0149286 | A1 | 5/2015 | Brown |
| 2015/0223022 | A1 | 8/2015 | Kumar et al. |
| 2015/0326624 | A1 | 11/2015 | Rajendran et al. |
| 2015/0341747 | A1 | 11/2015 | Barrand et al. |
| 2016/0094944 | A1 | 3/2016 | Kong et al. |
| 2016/0135005 | A1 | 5/2016 | Saha et al. |
| 2016/0294964 | A1 * | 10/2016 | Brune ................... H04L 67/26 |
| 2017/0048666 | A1 | 2/2017 | Choi et al. |
| 2017/0300968 | A1 | 10/2017 | Reiver |
| 2017/0372055 | A1 | 12/2017 | Robinson et al. |
| 2018/0020324 | A1 | 1/2018 | Beauford |
| 2018/0137487 | A1 * | 5/2018 | Wang .................. G06Q 20/14 |

OTHER PUBLICATIONS

U.S. Appl. No. 16/156,361 filed on 10/1012018, Non-Final Office Action dated Mar. 21, 2019.
IJ_S_ U.S. Appl. No. 15/601,508, filed May 22, 2017, Response to Non-Final Office Action dated Jan. 25, 2018.
U.S. Appl. No. 15/601,508, filed May 22, 2017, Notice of Allowance dated May 29, 2018.
U.S. Appl. No. 15/670,430, filed Aug. 7, 2017, Notice of Allowance dated Jul. 5, 2018.
PCT Patent Application PCT/US2018/030651 filed on May 2, 2018, International Search Report and Written Opinion dated Jul. 4, 2018.
U.S. Appl. No. 15/670,441, filed Aug. 7, 2017, Non-Final Office Action dated Sep. 5, 2018.
U.S. Appl. No. 15/670,441, filed Aug. 7, 2017, Notice of Allowance dated Aug. 2, 2019.
U.S. Appl. No. 16/156,361, filed Oct. 10, 2018, Notice of Allowance dated Jun. 21, 2019.
U.S. Appl. No. 15/601,508, filed May 22, 2017, Response to Non-Final Office Action dated Jan. 25, 2018.
IJ.S. U.S. Appl. No. 15/601,508, filed May 22, 2017, Notice of Allowance dated May 29, 2018.
U.S. Appl. No. 15/670,430, filed Aug. 7, 2017, Non-Final Office Action dated Feb. 23, 2018.
U.S. Appl. No. 15/601,538 filed on 05/2212017, Notice of Allowance dated Mar. 27, 2018.

* cited by examiner

TIME-RESTRICTED LOCATION-BASED SERVICE ZONE MANAGEMENT

CROSS-REFERENCE TO RELATED APPLICATION

This application is a continuation of co-pending U.S. utility application entitled, "Time-Restricted Location-Based Service Zone Management," having Ser. No. 15/601,533, filed May 22, 2017, which is hereby incorporated by reference in its entirety.

BACKGROUND

Geographic fences, or "geofences," and beacons can used for marketing purposes with respect to location-based services. For example, geofences can be used to provide notifications to a mobile device when the mobile devices enters a geographic region defined by the boundaries of a geofence. Likewise, when a mobile device is physically close to a beacon broadcasting a wireless signal, the mobile device can receive the broadcasted signal and a notification may be triggered. The notifications associated with geofences and/or beacons may relate to the location-based services.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
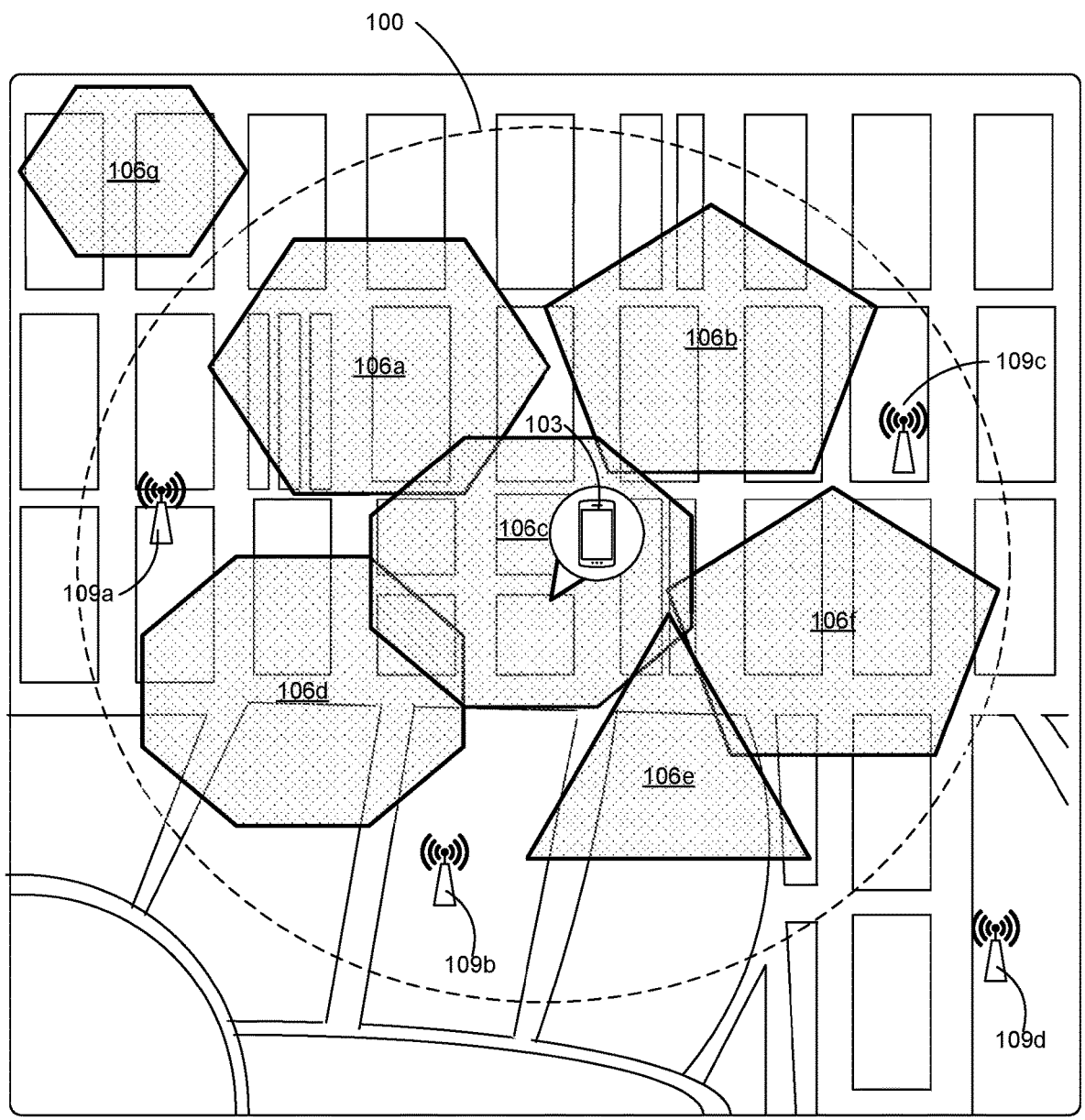
FIG. 1A is a drawing depicting an example scenario in which an active zone including location-based service zones to be monitored by a client device is created based in part on limitations of the client device according to various embodiments of the present disclosure.

The present disclosure relates to various systems and methods for managing location-based service zones (e.g., geofences, beacons, etc.). Some embodiments of the present disclosure relate to managing and creating a dynamically sized region surrounding a user device that contains a comprehensive set of location-based service zones while not exceeding limitations of the user device. Another embodiment of the present disclosure relates to managing location-based service zones that may only be active during certain time windows. Another embodiment of the present disclosure relates to managing location-based service zones for multiple providers who provide location-specific user experiences. By centralizing the management of location-based service zones for multiple providers, the competition for the constrained shared resources on a user device may be limited while still allowing the providers to independently manage their respective location-based service zones in a secure manner without the interference by other providers.

Examples of location-based service zones include geographic fences ("geofences") and beacons. A geofence can be defined as a virtual geographic boundary, such as the combination of a geographic coordinate and a radius. For example, a geofence may define an area in which a user may experience a location-based service associated with a particular provider. The geofenced area can be formed or defined by a virtual perimeter surrounding the area corresponding to the particular location-based service that a user may want to experience. An interior area of a geofence may be any suitable size and any suitable shape. The virtual perimeter can correspond to a two-dimensional or a three-dimensional perimeter. For example, assume that the provider relates to a delivery service. A two-dimensional perimeter can include an area centered on the delivery location, while a three-dimensional perimeter may include a height or altitude of the delivery location. For example, a three-dimensional perimeter may use height or altitude in order to situate the geofence on a particular floor or suite of a building.

A beacon may comprise a device configured to broadcast a wireless signal. Using the example of the delivery service, a provider device may include a beacon that broadcasts a wireless signal related to the location of the provider device. When a user device is within a proximity of a beacon, the user device can receive the wireless signal, thereby triggering an event notification associated with the beacon (e.g., displaying a message, notifying the provider device of proximate location, etc.).

Providers of services (e.g., mobile store, mobile delivery service, brick-and-mortar store, etc.) may create location-based service zones to initiate user experiences relative to the services. In one non-limiting example, a provider may be associated with a merchant selling items at mobile delivery locations. Each delivery location may be associated with a respective location-based service zone. For example, when the merchant is selling the items at location A, a geofence may be created that defines a boundary surrounding the merchant location. When a user device that is monitoring the geofence crosses the boundary defined by the geofence, the client device may recognize the geofence and perform actions associated with the geofence (e.g., display message including merchant location, send notification to provider to prepare items for pickup, etc.).

One embodiment of the present disclosure relates to managing and creating active zones for a specific user device. An active zone is a dynamically sized geographic area that contains a comprehensive set of location-based service zones while not exceeding limitations of the user device. A client device can receive the active zone containing the location-based service zones from an active zone management system and monitor the location-service zones included in the active zone.

FIG. 1A is a drawing depicting an example scenario showing the creation of an active zone 100 that includes multiple location-based service zones 101 (FIG. 2) to be monitored by a client device 103 according to various embodiments of the present disclosure. In this example, the client device 103 corresponds to a handheld mobile device (e.g., a tablet, a smartphone, etc.). The location-based service zones 101 can comprise geofences 106 (e.g., 106*a*, 106*b*, 106*c*, 106*d*, 106*e*, 106*f*, 106*g*), beacons 109 (e.g., 109*a*, 109*b*, 109*c*, 109*d*), and/or any other types of location-based service zones 101 as can be appreciated. The active zone 100 is created based in part on limitations of the client device 103. For example, different types of client devices 103 may have limitations as to the number of location-based service zones 101 the client device 103 can support. These limitations may be imposed by the client devices 103 in order to optimize power usage, memory usage, and/or processor usage of the client device 103.

In some embodiments, a location of a client device 103 is determined and an active zone 100 is created to encompass the client device location according to a predefined radius. For example, in some embodiments, the active zone 100 may be created having a center at the location of the client device 103 and a radius of some predetermined value (e.g., 1 kilometer (km), 5 km, 25 km, etc.). Once the active zone 100 is created, location-based service zones 101 within the active zone 100 may be identified. For example, in FIG. 1B, geofences 106*a*-*f* and beacons 109*a*-*c* are identified to be within the active zone 100, while geofence 106*g* and beacon 109*d* are not identified within the active zone 100.

In some embodiments, if there are no location-based service zones 101 within the active zone 100, the active zone 100 may be expanded to include location-based service zones 101 that may be located outside the original active zone 100. For example, the active zone 100 may initially be created to encompass areas within 1 km from the client device location. However, if there are no location-based service zones 101 within the area covered by the active zone 100, the active zone 100 may be expanded to encompass a larger area (e.g., 25 km from the client device location).

In some embodiments, if no location-based service zones 101 are identified within an active zone 100, the client device 103 may be notified that there are no location-based service zones 101 to monitor. In other embodiments, the quantity of location-based service zones 101 within an active zone 100 may exceed the maximum threshold of location-based service zones 101 supported by the client device 103. When the quantity of location-based service zones 101 exceeds the maximum threshold supported by the client device 103, certain identified location-based service zones 101 can be excluded from the active zone 100. Factors that may determine whether a location-based service zone 101 is excluded from or included in a particular active zone 100 may include, for example, the client device limitations, whether a service associated with a location-based service zone 101 is user-targeted (e.g., a single user) or broadly targeted (e.g., multiple users), an active status of a particular location-based service zones 101, an opt-in status by the client device for the respective service, and/or any other factor as can be appreciated.

Figure 1B:
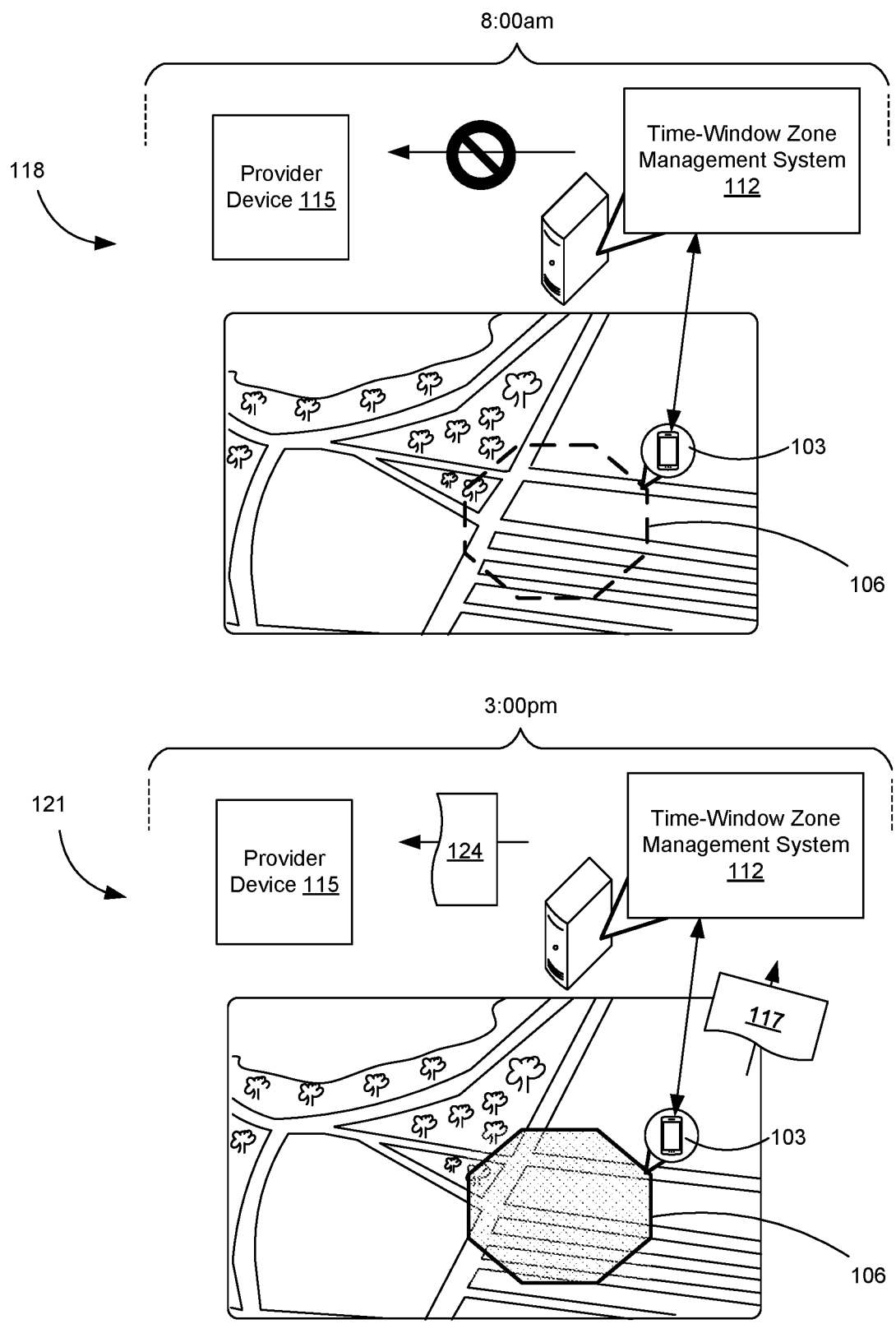
FIG. 1B is a drawing depicting an example scenario relating to the management of time-restricted location-based service zones according to various embodiment of the present disclosure.
Figure 2:
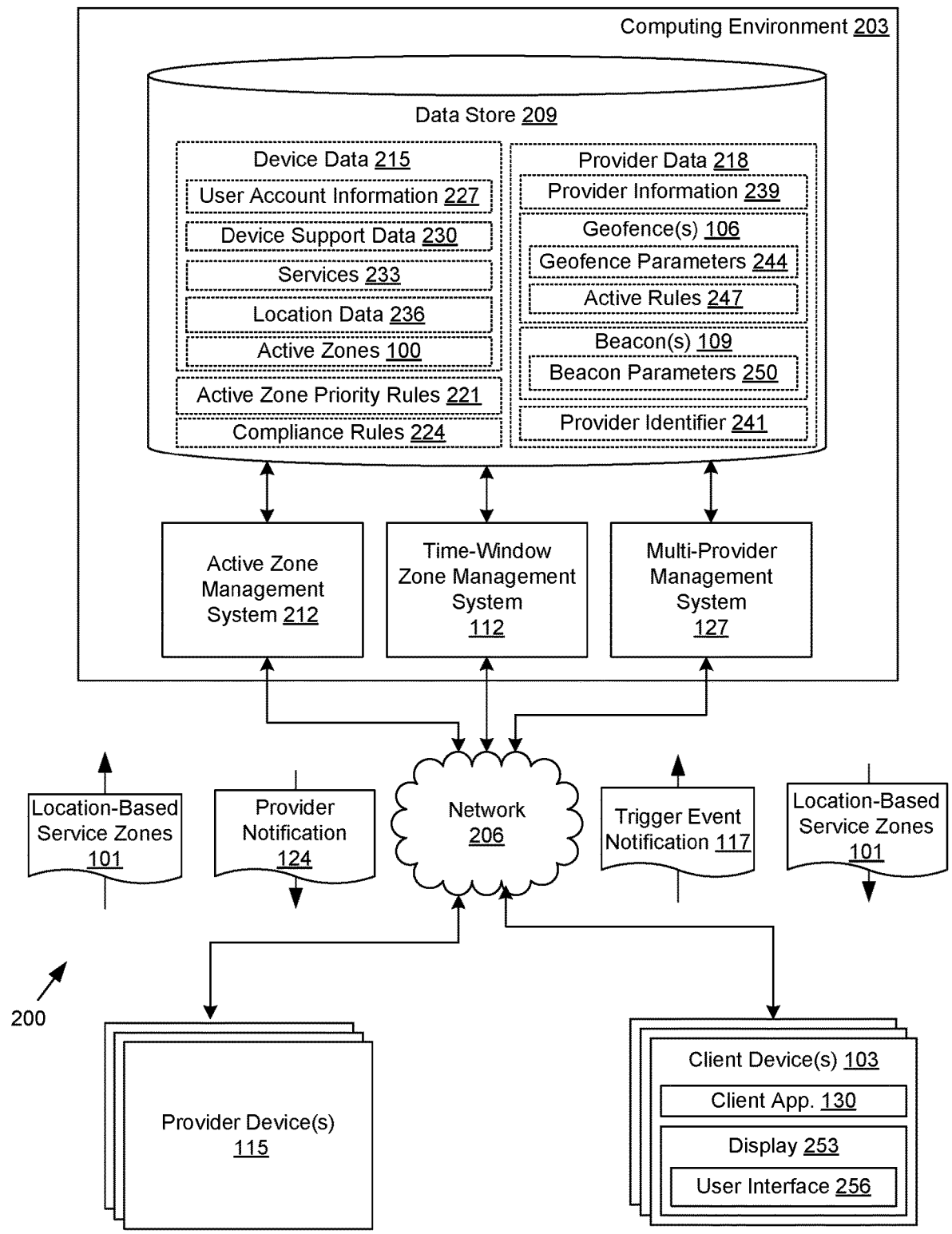
FIG. 2 is a schematic block diagram of a networked environment according to various embodiments of the present disclosure.

Another embodiment of the present disclosure relates to time-window zone management of time-restricted location-based service zones 101 (FIG. 2). FIG. 1B depicts an example scenario of a client device 103 entering into location-based service zone 101 and the behavior of the time-window zone management system 112 within the computing environment 203 (FIG. 2) in response to the client device 103 entering into the location-based service zone 101. While the example of FIG. 1B illustrates the location-based service zone 101 as a geofence 106, the location-based service zone 101 can also be a beacon 109 (FIG. 1A).

According to various embodiments, location-based service zones 101 may be active during some time periods and inactive during other time periods. For example, the time periods may active during a predefined schedule (e.g., one minute every hour), select days of the week (e.g., Monday, Wednesday, Friday), weekdays during business hours, weekends only, weekends during store hours, during select seasons of the year, etc. In other embodiments, a location-based service zone 101 may only be active when a provider device 115 is within the location of the particular location-based service zone.

When the client device 103 enters into the geographic region defined by a geofence 106 (or defined by where communications broadcasted by a beacon can be received), the client device 103 may send a trigger event notification 117 to a time-window zone management system 112 within a computing environment 203 (FIG. 2). According to various embodiments, the time-window zone management system 112 may determine whether the location-based service zone 101 is active or inactive in response to receiving the trigger event notification 117. The active status of a particular location-based service zone 101 can be based at least in part on a time associated with receiving the trigger event notification 117 from the client device, client device settings (e.g., whether the client device 103 is opted-in with the service associated with the location-based service zone), user account settings, parameters associated with the location-based service zone 101 (e.g., active time periods, targeted for specific users or multiple users, updates to geofence coordinates, etc.), a clock associated with the computing environment 203, and/or other factors as can be appreciated.

In the example of FIG. 1B, assume that a user associated with the client device 103 enters into the geographical area defined by the geofence 106 at a first time 118 and at a second time 121. Further, assume that the provider associated with the provider device 115 is a delivery service and that the user has scheduled a pickup with the provider for 3:00 pm. In this example, the geofence 106 may relate to a geographic region in which the provider device 115 is located. When the user enters the geographic region defined by the geofence 106 at the first time 118, the geofence is not active, and the client device 103 is not monitoring the geofence 106. Therefore, no action is taken by the client device 103.

In some example scenarios, the client device 103 may be monitoring the geofence 106 without an indication that the geofence 106 is inactive and may send a trigger event notification 117 to the time-window zone management system 112 of the computing environment 203. However, in this example, the time-window zone management system 112 may determine that the geofence 106 is not active for the particular client device 103 at that time of the trigger event notification 117. As such, the time-window zone management system 112 may refrain from notifying the provider device 115 of the trigger event associated with the client device 103. In addition, the time-window zone management system 112 may send a notification to the client device 103 informing the client device 103 that the geofence 106 is in a stale state and to discontinue monitoring of the geofence 106.

However, when the geofence 106 becomes active, the time-window zone management system 112 may send the geofence parameters 244 (FIG. 2) to the client device 103 for monitoring. As such, when the user with the client device 103 enters the geographic region defined by the geofence 106 at the second time 121, the client device 103 may send a trigger event notification 117 to the time-window zone management system 112. Upon receipt of the trigger event notification 117, the time-window zone management system 112 may determine that the geofence 106 is active because the second time 121 corresponds to the scheduled pick-up time. As such, the time-window zone management system 112 may send a notification 124 to the provider device 115, and the provider associated with the provider device 115 can prepare for the arrival of the user associated with the client device 103.

According to various embodiments of the present disclosure, the time-window zone management system 112 may rely on a clock associated with the computing environment 203 to determine whether a particular location-based service zone 101 is active or inactive. For example, the time associated with the client device 103 may not be accurate due to various factors such as, for example, clock skew, different time zones, or user alterations to the client device clock. By relying on the clock associated with the time-window zone management system 112, the time-window zone management system 112 can provide centralized management of the location-based active zones and increase reliability in determining the active status of a location-based active zone.

Figure 1C:
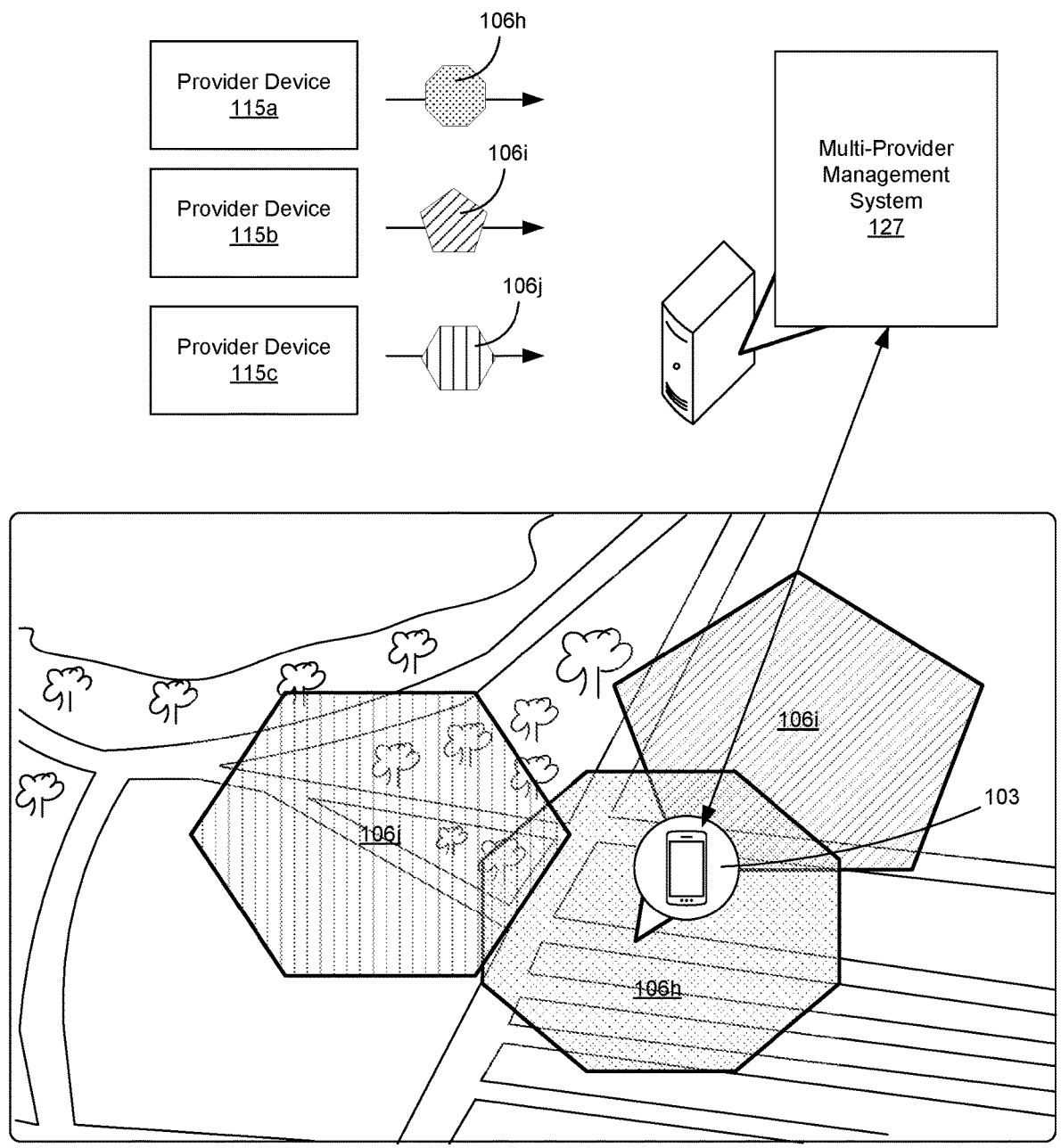
FIG. 1C is a drawing depicting an example scenario relating to the management of multiple providers of location-based service zones according to various embodiments of the present disclosure.

Another embodiment of the present disclosure relates to the centralized management of location-based service zones 101 (FIG. 2) associated with multiple providers. Specifically, FIG. 1C illustrates an example scenario where provider devices 115a, 115b, and 115c can all send location-based service zone data for associated location-based service zones 101 to the multi-provider management system 127. In turn, the multi-provider management system 127 can send notifications to the client device 103 including the location-based service zones 101 associated with the multiple providers. The multi-provider management system 127 is a secure and isolated system that allows multiple providers to share one or more client applications 130 (FIG. 2) executing on the client device 103. The multi-provider management system 127 can also control and restrict a provider from providing location-based service zones 101 to a client device 103 in response to a detection of abuse or violation of provider requirements.

In the example of FIG. 1C, provider device 115a is associated with geofence 106h, provider device 115b is associated with geofence 106i, and provider device 115c is associated with geofence 106j. While the example of FIG. 1C includes geofences 106, the multi-provider management system 127 can also manage providers associated with beacons 109 (FIG. 1A).

The multi-provider management system 127 can be configured to support multiple providers that use location-based service zones 101 with respect to various user-experienced services. According to various embodiments, a single client application 130 on the client device 103 may be configured to monitor location-based service zones 101 associated with the multiple providers. While the providers may share the same client application, the multi-provider management system 127 can be configured to isolate the various providers from one another such that each provider can coexist without knowledge of one another. For example, when a trigger event occurs on a client device 103, the multi-provider management system 127 can be configured to send a notification only to the provider device 115 that is associated with the trigger event. According to various embodiments, each provider may be associated with a unique token identifier such that any notification to the client device 103 and/or to the provider device 115 with respect to the location-based service zones 101 is specific to a particular provider.

In some embodiments, the multi-provider management system 127 can be configured to analyze the location-based service zones 101 associated with particular providers. Accordingly, the multi-provider management system 127 may be able to identify abuse by a particular provider and, if necessary, perform an action based on a level of severity by the provider. For example, the abuse may comprise spamming client devices 103 with an excessive number of location-based service zones 101, misconfiguring the parameters for a particular location-based service zone 101 (e.g., a geofence is associated with a particular brick-and-mortar store but is not near the store), and/or any other type of abuse as can be appreciated.

In other embodiments, the actions associated with the providers can be analyzed to verify that the providers and/or the corresponding location-based service zones 101 comply with a particular set of requirements. The requirements may include, for example, a number of location-based service zones 101, time restrictions, spacing requirements between one or more location-based service zones 101, single user-targeted location-based service zones 101, multi-user targeted coverage location-based service zones 101, time-window location-based service zones 101, types of location-based service zones 101 that are allowed or restricted, and/or any other type of requirement as can be appreciated. In response to a provider failing to comply with the requirements, the multi-provider management system 127 can refrain from providing location-based service zones 101 associated with the provider to a client device 103.

In other embodiments, the multi-provider management system 127 can analyze device settings of the client device 103 to determine which services the particular client device 103 has opted-in or has opted-out of receiving. Accordingly, the multi-provider management system 127 can determine which location-based service zones 101 to send to a particular client device 103 and/or whether a location-based service zone 101 associated with a particular provider should be provided to the client device 103. In other embodiments, the client device 103 may be unaware of the particular provider that is associated with a particular location-based service zone 101.

In the following discussion, a general description of the system and its components is provided, followed by a discussion of the operation of the same.

With reference to FIG. 2, shown is a networked environment 200 according to various embodiments. The networked environment 200 includes a computing environment 203, a client device 103, and a provider device 115, which are in data communication with each other via a network 206. The network 206 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 209 that is accessible to the computing environment 203. The data store 209 may be representative of a plurality of data stores 209 as can be appreciated. The data stored in the data store 209 for example, is associated with the operation of the various applications and/or functional entities described below.

The components executed on the computing environment 203, for example, include an active zone management system 212, a time-window zone management system 112, a multi-provider management system 127, and other applications, services, processes, systems, engines, or functionality not discussed in detail herein. The active zone management system 212 is executed to create active zones 100 for a particular computing device. An active zone 100 is a dynamically sized geographic area that contains a comprehensive set of location-based service zones while not exceeding limitations of the user device. In some embodiments, the active zone management system 212 can create and dynamically size an active zone to include location-based service zones 101 that are specific to a particular client device 103 and client device limitations. The active zone management system 212 can identify location-based service zones 101 within the created active zone 100.

In some embodiments, the active zone management system 212 can dynamically expand and/or reduce the size of the active zone 100 to include a quantity of location-based service zones 101 that do not exceed a device limitation. In some embodiments, the active zone management system 212 can reduce the number of location-based service zones 101 to provide to the client device 103. The active zone management system 212 can be configured to update and modify the active zones 100 based at least in part on a change in client device location, time restrictions associated with the location-based service zones 101, additions of location-based service zones 101, removal of location-based service zones 101, change in location-based service zone parameters, and/or any other factor as can be appreciated.

The time-window zone management system 112 is executed to manage the active status of time-restricted location-based service zones 101. The time-window zone management system 112 is further executed to send notifications to a provider device 115 in response to receiving a trigger event notification 117 from a client device when the location-based service zone 101 is determined to be active. The time-window zone management system 112 is further executed to send notifications to the client device 103 with respect to the active status of particular location-based service zones 101. The time-window zone management system 112 can also be executed to receive trigger event notifications 117 from the client device 103 and generate timestamps associated with the receipt of the trigger event notifications 117.

The multi-provider management system 127 is executed to manage the location-based service zones 101 associated with multiple providers. The multi-provider management system 127 is further executed to generate unique identifiers for each provider to provide a secure and centralized management of sending location-based service zones 101 to client devices 103 for monitoring and sending notifications of trigger events to the appropriate provider devices 115 only. The multi-provider management system 127 may further be executed to detect abuses and/or noncompliance with requirements by providers.

The data stored in the data store 209 includes, for example, device data 215, provider data 218, active zone priority rules 221, compliance rules 224, and potentially other data. The device data 215 includes data associated with different client devices 103. The device data 215 may include user account information 227, device support data 230, services 233, location data 236, active zones 100, and/or any other data associated with a client device 103.

The user account information 227 may comprises information related to one or more user accounts associated with the client device 103. For example, the user account information 227 may include a username, a first and last name, and/or other identify information. The device support data 230 includes a quantity of location-based service zones 101 supported by the client device 103, and/or other features supported by the device. The service(s) 233 includes one or more user-experienced services associated with providers that a particular device and/or user account may have opted-in to participate, opted-out from participating, and/or are preconfigured with respect to the client application 130 and/or any other application. For example, provider A and provider B may each provide a different service in which a user can opt-in to experience (e.g., delivery service, mobile store, deliver locker, brick and mortar store sale, etc.). However, the user may opt-in on the service provided by provider A, and opt-out of the service provided by provider B. The location data 236 represents a geographic location of the client device 103. The active zone(s) 100 may include the active zones 100 for the particular device 103 that contain the comprehensive set of location-based service zones 101 specifically selected for the particular device 103 in view of the device limitations, whether a service associated with a location-based service zone 101 is user-targeted (e.g., a single user) or broadly targeted (e.g., multiple users), an active status of a particular location-based service zones 101, an opt-in status by the client device for the respective service, and/or any other factor as can be appreciated.

The provider data 218 includes data associated with the providers of the location-based service zones 101. The provider data 218 includes provider information 239, geofence(s) 106, beacon(s) 109, a provider identifier 241, and/or any other data associated with the providers. The provider information 239 may include identifying information about the provider such as, for example, the name, service information, address information, provider device information, and/or any other appropriate information about the provider. The geofence 106 represents the virtual geographic boundaries related to the services of the provider. The geofence 106 includes geofence parameters 244, active rules 247, and/or any other type of data associated with the geofence 106. The geofence parameters 244 may include one or more coordinates associated with the geographic location, a radius of the interior area, perimeter specifications for non-circular areas, messages to be presented to the user of a client device 103 one a client device is within the boundary (e.g., "Sale at XYZ Store. Stop in and receive 50% off one item."), an active time, an active date, a unique token identifier, and/or other parameters associated with the geofence 106. The active rules 247 include information related to when a particular geofence 106 is active or inactive. For example, the active rules 247 may include one or more time windows representing when the geofence is active and/or inactive. In some embodiments, a geofence 106 may be active during a set time during the day (e.g., store hours). In other embodiments, a geofence 106 may be active periodically. For example, the geofence 106 may be created to be active every three (3) hours.

The beacon(s) 109 represent the devices configured to broadcast wireless signals. The beacon(s) 109 include beacon parameters 250 that include the beacon identifier that a client device 103 can use to access the wireless signal broadcasted from the beacon 109 when the client device 103 is within the range to receive the broadcasted signal. The provider identifier 241 represents the unique identifier assigned to each provider with respect to managing location-based service zones 101 and notifying the correct provider of trigger events associated with the location-based service zone 101 of that provider. In some embodiments, the provider identifier 241 is randomly generated. In other embodiments, the provider identifier 241 is assigned according to a predetermined increment or decrement relative to other provider identifiers 241.

The active zone priority rules 221 represent rules that the active zone management system 212 may use in selecting location-based service zones 101 to be included in active zones 100. The active zone priority rules 221 may be based on, for example, the client device limitations, whether a service associated with a location-based service zone 101 is user-targeted (e.g., a single user) or broadly targeted (e.g., multiple users), an active status of a particular location-based service zones 101, an opt-in status by the client device for the respective service, and/or any other factor as can be appreciated. In some embodiment, the active zone priority rules 221 may comprise algorithms such as, a ranking algorithm, for example, for determining a priority of the location-based service zones 101. For example, the active zone priority rules 221 may comprise weights to assign for various features associated with each location-based service zone 101. Based on the assigned weights, the location-based service zones 101 that are identified within a created active zone 100 may be ranked and the highest ranked location-based service zones 101 that are within the maximum threshold supported by the client device 103 may be selected.

The compliance rules 224 represent the rules that the multi-provider management system 127 may consider when determining whether a provider is abusing or otherwise being noncompliant with respect to the location-based service zones 101 associated with that provider. The compliance rules 224 may be based on, for example, a number of location-based service zones 101 associated with the provider, time restrictions associated with the location-based service zones 101, spacing requirements between one or more location-based service zones 101, types of location-based service zones 101 that are allowed or restricted (e.g., single user-targeted location-based service zones 101, multi-user targeted coverage location-based service zones 101, time-window location-based service zones 101), and/or any other type of compliance factor as can be appreciated.

In some embodiments, the compliance rules 224 may further comprise a list of actions that the multi-provider management system could employ based on a detection of abuse and/or non-compliance. For example, the list of actions may comprise notifying client devices 103 monitoring location-based service zones 101 for that provider to remove any information associated with those location-based service zones 101, notifying the provider of the abuse and/or noncompliance, requesting the provider to correct the abuse and/or noncompliance within a predetermined time, and/or any other appropriate action. In some embodiments, the compliance rules 224 may define a level of severity for abuse and/or non-compliance by a provider. For example, the compliance rules 224 may define spamming client devices 103 with location-based service zones 101 as being more severe than a misconfiguration of a location-based service zone 101 (e.g., a geofence 106 not surrounding a particular store to which it is related). The actions defined by the compliance rules 224 may be determined according to the level of severity.

The client device 103 is representative of a plurality of client devices that may be coupled to the network 206. The client device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 103 may include a display 253. The display 253 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 103 may be configured to execute various applications such as a client application 130 and/or other applications. The client application 130 may be executed in a client device 103, for example, to access network content served up by the computing environment 203 and/or other servers, thereby rendering a user interface 256 on the display 253. To this end, the client application 130 may comprise, for example, a browser, a dedicated application, etc., and the user interface 256 may comprise a network page, an application screen, etc. The client device 103 may be configured to execute applications beyond the client application 130 such as, for example, email applications, social networking applications, word processors, spreadsheets, and/or other applications.

The provider device 115 is representative of a plurality of provider devices that may be coupled to the network 206. The provider device 115 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. Alternatively, the provider device 115 may employ a plurality of computing devices that may be arranged, for example, in one or more server banks or computer banks or other arrangements. Such computing devices may be located in a single installation or may be distributed among many different geographical locations. For example, the provider device 115 may include a plurality of computing devices that together may comprise a hosted computing resource, a grid computing resource, and/or any other distributed computing arrangement. In some cases, the provider device 115 may correspond to an elastic computing resource where the allotted capacity of processing, network, storage, or other computing-related resources may vary over time.

Figure 3:
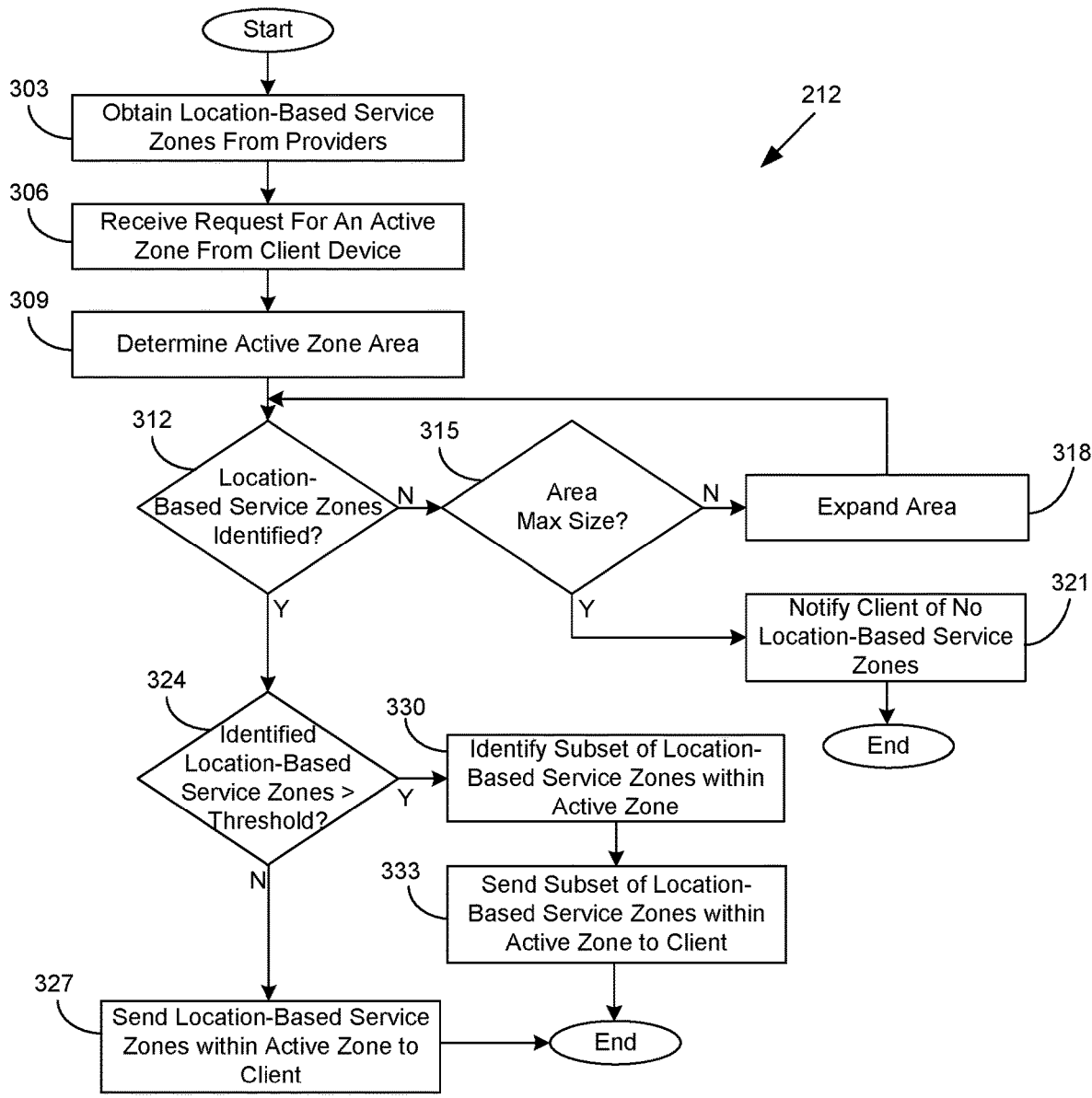
FIG. 3 is a flowchart illustrating one example of functionality implemented as portions of an active zone management system executed in a computing environment in the networked environment of FIG. 2 according to various embodiments of the present disclosure.

Referring next to FIG. 3, shown is a flowchart that provides one example of the operation of a portion of the active zone management system 212 according to various embodiments. It is understood that the flowchart of FIG. 3 provides merely an example of the many different types of functional arrangements that may be employed to implement the operation of the portion of the active zone management system 212 as described herein. As an alternative, the flowchart of FIG. 3 may be viewed as depicting an example of elements of a method implemented in the computing environment 203 (FIG. 2) according to one or more embodiments.

FIG. 3 provides a non-limiting example of the functionality that may be performed by the active zone management system 212 with respect to creating an active zone 100 (FIG. 1A) according to various embodiments of the present disclosure. Beginning with box 303, the active zone management system 212 receives location-based service zones 101 (FIG. 2) from one or more provider devices 115. A provider device 115 (FIG. 2) may be configured to send geofence parameters 244 (FIG. 2) for a geofence 106 (FIG. 2) and/or beacon parameters 250 (FIG. 2) for a beacon 109 (FIG. 2) that are associated with the service provider of the provider device 115 to the active zone management system 212.

For example, assume the provider is a merchant that is offering a set of items at a mobile location for purchase, and that the merchant will be at various locations throughout the day. Upon arriving at a particular location, the geofence parameters 244 for the mobile location may encoded by the provider device 115 and/or the geofence perimeter coordinates may be sent to the active zone management system 212. In some embodiments, the location-based service zones 101 are sent to the active zone management system 212 in response to response to receiving a push notification (e.g., silent or non-silent push notification) from the active zone management system 212.

At box 306, the active zone management system 212 receives a request for an active zone 100 from the client device 103. The request includes location data 236 (FIG. 2), which may be used by the active zone management system 212 to populate the active zone 100 with location-based service zones 101. At box 309, the active zone management system 212 determines the active zone area. Specifically, the active zone management system 212 determines the active zone area based in part on the location data 236. According to various embodiments, the active zone area may be determined by using the location of the client device 103 from the location data 236 as a center point and encompassing the center point by a radius of some predetermined value (e.g., 1 kilometer (km), 5 km, 25 km, etc.).

At box 312, the active zone management system 212 determines whether any location-based service zones 101 are located within the geographic region of the created active zone area. For example, the active zone management system 212 may analyze the location-based service zones 101 provided by the provider device(s) 115 to determine whether any correspond to the geographic region associated with the active zone area. In some embodiments, the active zone management system 212 may use the active status of the location-based service zones 101 in determining whether any location-based service zones 101 are included within the active zone area. If there are not any location-based service zones 101 identified in the active zone 100, the active zone management system 212 proceeds to box 315. At box 315, the active zone management system 212 determines whether the active zone area has reached its maximum threshold.

For example, in some embodiments, the active zone 100 may be created using a range of sizes (e.g., 1 kilometer (km) to 100 km). According to various embodiments, the active zone may be initially created at a minimum size and can be dynamically increased if needed to include a desired or required number of location-based service zones 101. However, if needed, the active zone management system 212 can expand the size of the active zone up to the maximum size. The active zone size may be based on a predefined threshold, a provider limitation, and/or a client device limitation. If the active zone area cannot be increased, the active zone management system 212 proceeds to box 321 where a client device is notified that there is not an active zone 100 for the particular device location. In some embodiments, this notification can be in the form of a push notification (e.g., silent or non-silent notifications) or any other suitable notification. Upon notifying the client device 103 that there is not a valid active zone for the client device 103, the active zone management system 212 ends.

Referring back to box 315, if size of the active zone area is below a predefined maximum active zone area size, the active zone management system 212 proceeds to box 318. At box 318, the active zone management system 212 may expand the area of the active zone 100. In some embodiments, the area may be expanded incrementally, exponentially, and/or randomly so long as the area does not exceed the maximum size. Upon expanding the area of the active zone 100, the active zone management system proceeds to box 312 to identify any location-based service zones 101 within the active zone 100.

Upon identifying location-based service zones 101 within the active zone, the active zone management system 212 proceeds to box 324. At box 324, the active zone management system 212 determines whether the number of identified location-based service zones 101 meets or exceeds the device limitations identified in the device support data 230 (FIG. 2). For example, the device support data 230 may specify that the client device 103 can only support twenty (20) location-based service zones 101. As such, if more than twenty location-based service zones 101 are identified within the active zone 100, the active zone management system 212 will determine that the number of location-based service zones 101 within the active zone 100 exceed the maximum threshold and will proceed to box 330. If the number of location-based service zones 101 identified within active zone 100 is within the maximum threshold, the active zone management system 212 proceeds to box 327. At box 327, the active zone management system 212 sends data encoding an identification of the active zone 100 and corresponding location-based service zones 101 to the client device 103. The notification can be in the form of a push notification (e.g., silent or non-silent notifications) or any other suitable notification.

At box 330, the active zone management system 212 identifies a subset of location-based service zones 101 within the active zone 100. In identifying a subset of location-based service zones 101, the active zone management system 212 may apply the active zone priority rules 221 (FIG. 2) to determine the optimal location-based service zones 101 for the particular client device 103 within the active zone 100. In some embodiments, the active zone management system 212 may weight and/or rank the location-based service zones 101 based on factors that may include, for example, the client device limitations, whether a service associated with a location-based service zone 101 is user-targeted (e.g., a single user) or broadly targeted (e.g., multiple users), an active status of a particular location-based service zones 101, an opt-in status by the client device for the respective service, and/or any other factor as can be appreciated. For example, the active zone priority rules 221 may comprise weights to assign for various features associated with each location-based service zone 101.

Based on the assigned weights, the location-based service zones 101 within the active zone 100 may be ranked and the highest ranked location-based service zones that are within the maximum threshold supported by the client device 103 may be selected as the subset. In other embodiments, the active zone management system 212 may exclude location-based service zones 101 based on respective characteristics until the maximum threshold is no longer exceeded. For example, the active zone management system 212 per the active zone priority rules 221 may remove location-based service zones 101 that are inactive and location-based service zones 101 related to a service that the user has not opted-in to participate before removing location-based service zones 101 that are user-targeted and/or are associated with services in which a user has opted-in. Once the location-based service zones 101 with the active zone 100 for a specific device 103 are reduced to being within the maximum threshold as defined by the client device 103, the active zone management system 212 proceeds to box 333. At box 333, the active zone management system 212 sends data encoding an identification of the active zone 100 and corresponding subset of location-based service zones 101 to the client device 103. The notification can be in the form of a push notification (e.g., silent or non-silent notifications) or any other suitable notification. After sending the active zone 100 to the client device 103, the active zone management system 212 ends.

Figure 4:
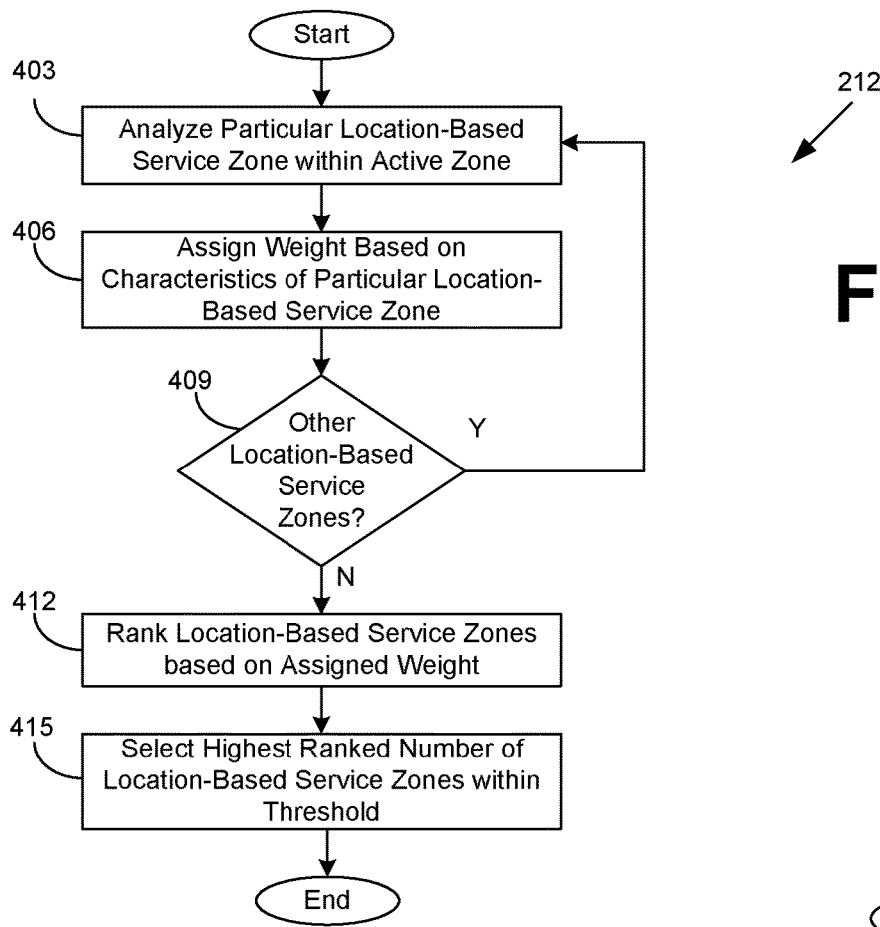
FIG. 4 is a flowchart illustrating one example of functionality implemented as portions of an active zone management system executed in a computing environment in the networked environment of FIG. 2 according to various embodiments of the present disclosure.

Turning now to FIG. 4, shown is a flowchart that provides one example of the operation of a portion of the active zone management system 212 according to various embodiments. It is understood that the flowchart of FIG. 4 provides merely an example of the many different types of functional arrangements that may be employed to implement the operation of the portion of the active zone management system 212 as described herein. As an alternative, the flowchart of FIG. 4 may be viewed as depicting an example of elements of a method implemented in the computing environment 203 (FIG. 4) according to one or more embodiments.

FIG. 4 provides a non-limiting example of the functionality that may be performed by the active zone management system 212 with respect to prioritizing location-based service zones 101 (FIG. 2) to include in the active zone 100 (FIG. 2) when the quantity of location-based service zones 101 originally identified in the active zone 100 exceed the maximum threshold that the client device 103 (FIG. 2) can support according to various embodiments of the present disclosure.

Beginning with box 403, the active zone management system 212 analyzes a particular location-based service zone 101 within the active zone 100. Specifically, the active zone management system 212 analyzes the location-based service zones 101 to identify the characteristics such as, for example, time restrictions, a type of location-based service zone 100 (e.g., user-specific targeted or broad multi-user targeted), whether the client device 103 and/or the specific user account associated with the active zone request has opted-in to the user experience associated with the location-based service zone, and/or other factors. The characteristics can be used to determine the priority of the location-based service zones 101 relative to the active zone 100 and/or the client device 103.

At box 406, the active zone management system 212 assigns weights to each of the location-based service zones 101 according to the characteristics and the active zone priority rules 221. For example, a location-based service zone 101 that is associated with a service identified in the services 233 of the client device that indicates the user has opted-in to participate in the service may receive a higher weight than a location-based service zone 101 that is associated with a service identified in the services 233 of the client device 103 that indicates the user has opted-out from participating in the service. In some embodiments, the sum of the weights assigned to each of the characteristics of the location-based service zone 101 is assigned to the specific location-based service zone 101.

At box 409, the active zone management system determines whether there are any remaining location-based service zones 101 identified in the active zone 100 that require analysis. If there are other location-based service zones 101, the active zone management system 212 returns to box 403. Otherwise, the active zone management system 212 proceeds to box 412. At box 412, the active zone management system 212 ranks the location-based service zones 101 identified in the active zone 100 according to the assigned weights. At box 415, the active zone management system 212 selects the highest ranked number of location-based service zones 101 that are within the predefined limitation (e.g., client-specified, service-side limitation, etc.). For example, if there are two-hundred identified location-based service zones 101 within the active zone 100, and the client device 103 only supports one-hundred location-based service zones 101, the active zone management system 212 will select the top hundred ranked location-based service zones 101. Upon selecting the subset of location-based service zones 101, this portion of the active zone management system 212 ends.

Figure 5:
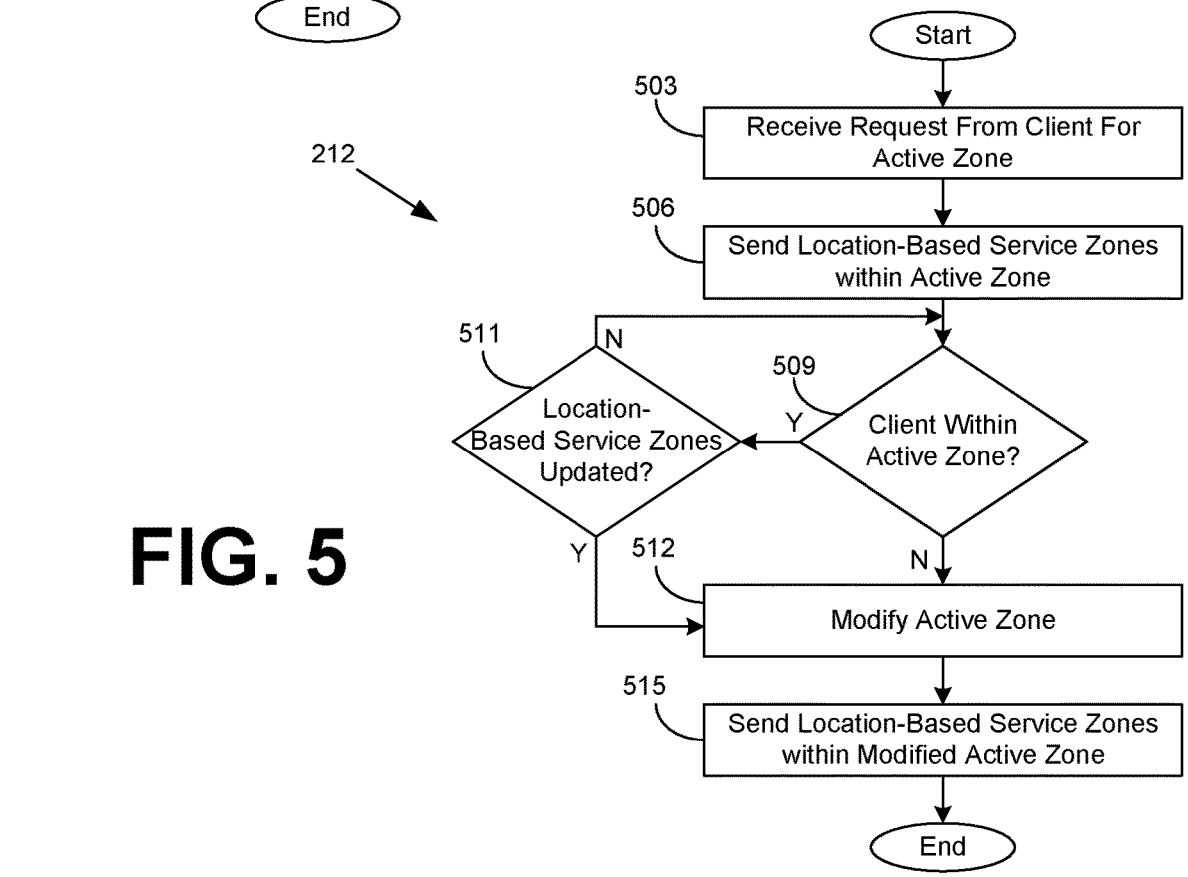
FIG. 5 is a flowchart illustrating one example of functionality implemented as portions of an active zone management system executed in a computing environment in the networked environment of FIG. 2 according to various embodiments of the present disclosure.

Referring next to FIG. 5, shown is a flowchart that provides one example of the operation of a portion of the active zone management system 212 according to various embodiments. It is understood that the flowchart of FIG. 5 provides merely an example of the many different types of functional arrangements that may be employed to implement the operation of the portion of the active zone management system 212 as described herein. As an alternative, the flowchart of FIG. 5 may be viewed as depicting an example of elements of a method implemented in the computing environment 203 (FIG. 2) according to one or more embodiments.

FIG. 5 provides a non-limiting example of the functionality that may be performed by the active zone management system 212 with respect to modifying the active zones 100 (FIG. 2) for a particular client device 103 (FIG. 2) according to various embodiments of the present disclosure.

Beginning with box 503, the active zone management system 212 receives a request from the client device 103 for an active zone 100. In some embodiments, the client device 103 sends the request as a pull notification and/or other client initiated request. In other embodiments, the client device 103 may be configured to send the request in response to receiving a push notification (e.g., silent or non-silent push notification) from the active zone management system 212 notifying the client device 103 that an active zone 100 can be sent. At box 506, the active zone management system 212 sends data encoding the identification of the active zone 100 and corresponding location-based service zones 101 within the active zone 100 to the client device 103.

At box 509, the active zone management system 212 determines whether the client device 103 is still located within the geographic boundaries defined by the active zone 100. In some embodiments, the client device 103 may periodically send a notification to the active zone management system 212 with location data 236 (FIG. 2). In other embodiments, the active zone management system 212 may send a request to the client device 103 for the location data 236. If the client device 103 is within boundaries of the active zone 100, the active zone management system 212 proceeds to box 511. Otherwise, the active zone management system 212 proceeds to box 512.

At box 511, the active zone management system 212 determines whether any of the location-based service zones 101 included in the active zone 100 being monitored by the client device 103 have been updated. For example, a location-based service zone 101 may be time-restricted and may be inactive. In another non-limiting example, the client device 103 may have opted-out of the user experience associated with the location-based service zone 101. In another non-limiting example, the provider may have cancelled the location-based service zone 101. If the location-based service zones 101 remain the same, the active zone management system 212 proceeds to box 509. Otherwise, the active zone management system 212 proceeds to box 512.

At box 512, the active zone management system 212 modifies the active zone 100. In some embodiments, modifying the active zone 100 may comprise creating a new active zone area and populating the new active zone 100 with new location-based service zones 101. In other embodiments, modifying the active zone 100 may comprise keeping the original active zone area and changing the location-based service zones 101 within the active zone 100.

If the location data 236 indicates that the client device 103 has moved outside of the boundaries defined by the active zone 100, the active zone management system 212 may modify the active zone 100 by creating a new active zone area, and therefore, a new active zone 100 according to the updated client device location. The active zone management system 212 may modify the active zone 100 and the location-based service zones 101 within the active zone 100 as discussed with respect to FIGS. 3 and 4.

If the client device 103 is still within the boundaries of the active zone 100 and one or more of the location-based service zones 101 have been updated, the active zone management system 212 may re-evaluate the location-based service zones 101 within the active zones 100 as discussed with respect to FIGS. 3 and 4. In some scenarios, the active zone 100 is modified to remove location-based service zones 101. In other embodiments, the active zone 100 can be modified to add location-based service zones 101.

At box 515, the active zone management system 212 sends data encoded with the corresponding parameters for the modified active zone 100 and corresponding location-based service zones 101 to the client device 103. After sending the data to the client device 103, this portion of the active zone management system 212 ends.

Figure 6:
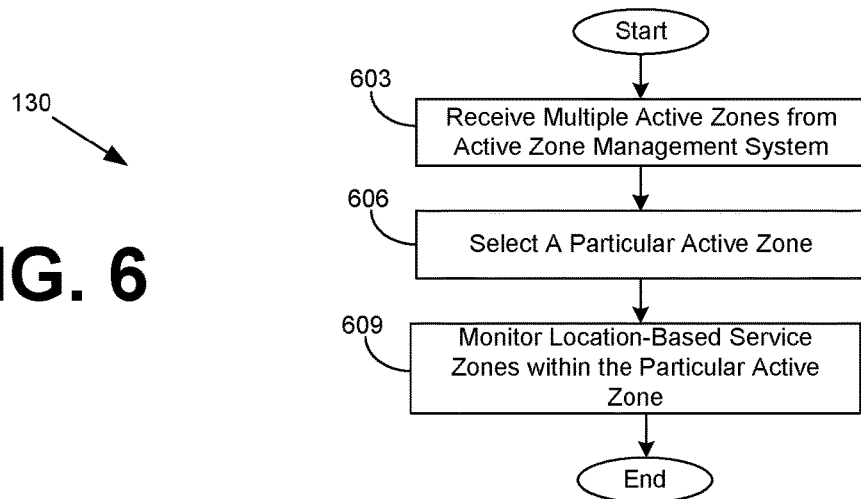
FIG. 6 is a flowchart illustrating one example of functionality implemented as portions of a client application executed in a client device in the networked environment of FIG. 2 according to various embodiments of the present disclosure.

Referring next to FIG. 6, shown is a flowchart that provides one example of the operation of a portion of the client application 130 according to various embodiments. It is understood that the flowchart of FIG. 6 provides merely an example of the many different types of functional arrangements that may be employed to implement the operation of the portion of the client application 130 as described herein. As an alternative, the flowchart of FIG. 6 may be viewed as depicting an example of elements of a method implemented in the computing environment 203 (FIG. 2) according to one or more embodiments.

FIG. 6 provides a non-limiting example of the functionality that may be performed by the client application 130 with respect to client-side active zone management according to various embodiments of the present disclosure.

Beginning with box 603, the client application 130 may receive multiple active zones 100 (FIG. 2) from the active zone management system 212 (FIG. 2). The active zones 100 may be received in response to a pull notification, a push notification, and/or any other appropriate notification. In some embodiments, the active zone management system 212 may be able to create multiple active zones 100 based at least in part on multiple different locations associated with the client device 103. In some embodiments, the client device 103 may provide location data 236 (FIG. 2) that includes different locations for the client device 103. For example, the client device 103 may be able to provide the active zone management system 212 with current locations of the client device and/or future locations of the client device (e.g., scheduled item pick up location).

Accordingly, the active zone management system 212 may be able create multiple active zones 100 based on the different locations. In other embodiments, the different active zones 100 may be further based at least in part on type of location-based service zones 101, such as, for example, user targeted, broad-targeted, time-restricted, date-restricted, etc., whether the client device 103 has opted-in to the service associated with the location-based service zones 101, and/or other factors.

At box 606, the client application 130 may select a particular active zone 100 to monitor. For example, the different active zones 100 are location-based and therefore, the client application 130 may be able to determine which active zone 100 is appropriate for the client device 103 based on the location of the client device 103. The client device 103 may track its location using, for example, wireless network identification information and/or cellular triangulation data. The client device 103 may select a particular active zone 100 according to time by being able to have multiple active zones 100 already stored in local memory that will be used by the client device 103 during a predefined time period, the client device 103 can save power by avoiding polling the active zone management device for additional active zones 100.

At box 609, the client application 130 begins monitoring the location-based service zones 101 within the selected active zone 100. Once the client application 130 begins monitoring the location-based service zones 101 within the selected active zone 100, this portion of the client application 130 ends.

Figure 7:
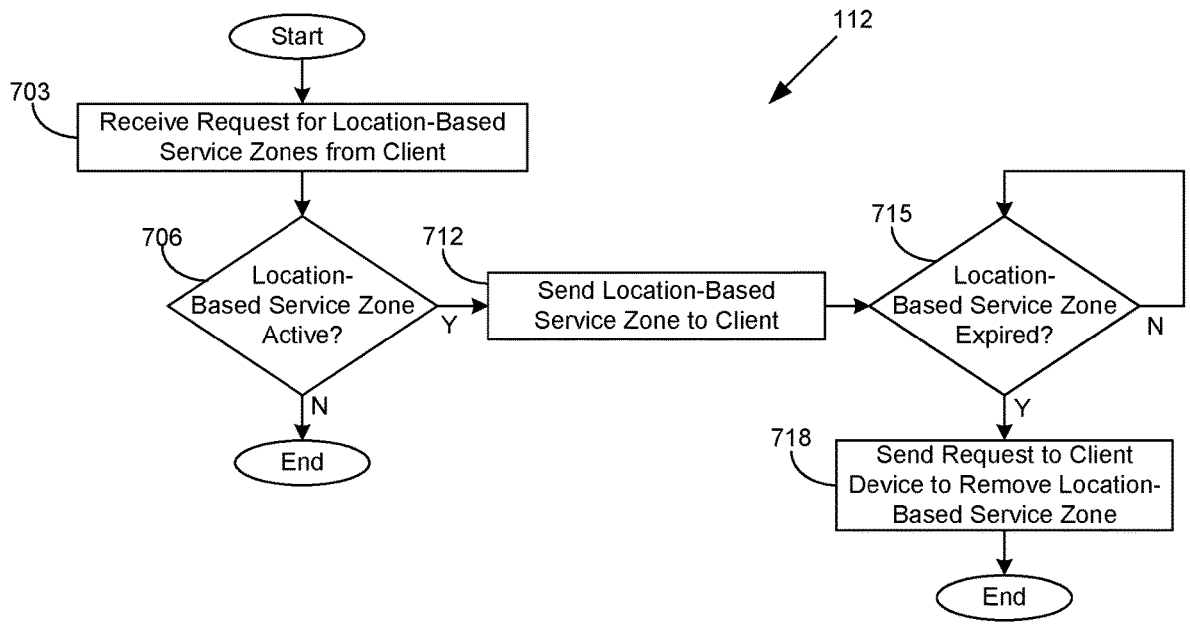
FIG. 7 is a flowchart illustrating one example of functionality implemented as portions of a time-window zone management system executed in a computing environment in the networked environment of FIG. 2 according to various embodiments of the present disclosure.

Referring next to FIG. 7, shown is a flowchart that provides one example of the operation of a portion of the time-window zone management system 112 according to various embodiments. It is understood that the flowchart of FIG. 7 provides merely an example of the many different types of functional arrangements that may be employed to implement the operation of the portion of the time-window zone management system 112 as described herein. As an alternative, the flowchart of FIG. 7 may be viewed as depicting an example of elements of a method implemented in the computing environment 203 (FIG. 2) according to one or more embodiments.

FIG. 7 provides a non-limiting example of the functionality that may be performed by the time-window zone management system 112 with respect to managing active and inactive location-based service zones 101 (FIG. 2) according to various embodiments of the present disclosure. Specifically, FIG. 7 relates to determining when a location-based service zone 101 is active or has expired, and notifying the client device 103 (FIG. 2) accordingly.

Beginning with box 703, the time-window zone management system 112 receives a request for location-based service zones 101 from the client device 103. In some embodiments, the client device 103 sends the request as a pull notification and/or other client-initiated request. In other embodiments, the client device 103 may be configured to send the request in response to receiving a push notification (e.g., silent or non-silent push notification) from the time-window zone management system 112 telling the client device 103 to request the location-based service zones 101.

At box 706, the time-window zone management system 112 determines whether a particular location-based service zone is active. For example, if a certain location-based service zone 101 is only valid during certain time periods, then the time-window zone management system 112 may compare the time relative to the computing environment 203 with the time periods of activity for the location-based service zone 101 to determine the status of the location-based service zone 101. In some embodiments, the time-window zone management system 112 may determine that the location-based service zone 101 will not be active in the period before the next anticipated request form the client device 103 for location-based service zones 101. By refraining to send the location-based service zone 101 to the client device 103, the impact to the client device 103 can be reduced (e.g., power consumption, network resources, etc.).

If the location-based service zone 101 is inactive, then the time-window zone management system 112 refrains from sending the location-based service zone 101 to the client device. If the time-window zone management system 112 determines that the location-based service zone 101 is inactive, this portion of the time-window zone management system 112 ends. However, if the location-based service zone 101 is active, the time-window zone management system 112 proceeds to box 712.

At box 712, the time-window zone management system 112 sends data encoded with the identification of the location-based service zone 101, including the corresponding parameters (e.g., geofence parameters 244 (FIG. 2), beacon parameters 250 (FIG. 2)) to the client device 103.

At box 715, the time-window zone management system 112 determines whether the location-based service zone 101 has expired. For example, the time-window zone management system 112 may compare the local time with the time-periods where the location-based service zone 101 is active. If the local time is outside the time-periods of activity for the location-based service zone 101, the time-window zone management system 112 will determine that the location-based service zone 101 has expired and will proceed to box 718. Otherwise, the time-window zone management system 112 will determine that the location-based service zone 101 is still active, and will then continue monitoring the time and/or the location-based service zone 101 for a change in active status.

At box 718, the time-window zone management system 112 will send a notification to the client device 103 (e.g., a silent or non-silent push notification) requesting that the client device 103 remove all information related to the location-based service zone 101. Accordingly, the client device 103 will no longer monitor the location-based service zone 101. After the time-window zone management system 112 sends the notification to the client device 103 requesting removal of the location-based service zone 101, this portion of the time-window zone management system 112 ends.

Figure 8:
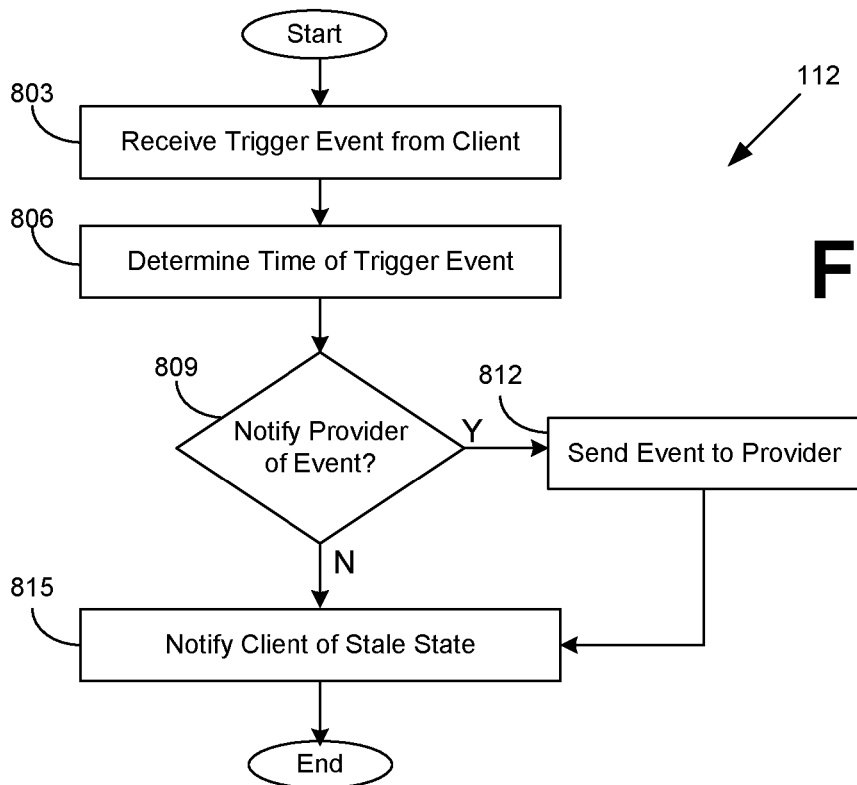
FIG. 8 is a flowchart illustrating one example of functionality implemented as portions of a time-window zone management system executed in a computing environment in the networked environment of FIG. 2 according to various embodiments of the present disclosure.

Referring next to FIG. 8, shown is a flowchart that provides one example of the operation of a portion of the time-window zone management system 112 according to various embodiments. It is understood that the flowchart of FIG. 8 provides merely an example of the many different types of functional arrangements that may be employed to implement the operation of the portion of the time-window zone management system 112 as described herein. As an alternative, the flowchart of FIG. 8 may be viewed as depicting an example of elements of a method implemented in the computing environment 203 (FIG. 2) according to one or more embodiments.

FIG. 8 provides a non-limiting example of the functionality that may be performed by the time-window zone management system 112 with respect to determining whether to notify a provider of a trigger event associated with a location-based service zone 101 (FIG. 2). Specifically, FIG. 8 discusses filtering trigger events that are associated with inactive location-based service zones 101 according to various embodiments of the present disclosure.

Beginning with box 803, the time-window zone management system 112 receives a trigger event notification 117 (FIG. 2) associated with a location-based service zone 101 from the client device 103. In some embodiments, if the location-based service zone 101 were a geofence 106 (FIG. 2), the trigger event notification 117 may relate to a trigger event caused by the client device 103 passing through the boundary defined by the geofence parameters 244 (FIG. 2). In other scenarios, if the location-based service zone 101 were a beacon 109 (FIG. 2), the trigger event notification 117 may correspond to the client device 103 receiving the wireless signal being broadcasted by the beacon 109.

At box 806, the time-window zone management system 112 determines the time associated with the trigger event. According to various embodiments to the present disclosure, the time-window zone management system 112 relies on a clock associated with the time-window zone management system 112 to determine the time of the trigger event. For example, in one non-limiting example, the time-window zone management system 112 may generate a timestamp at the time of receiving the trigger event notification 117.

The time associated with the time-window zone management system 112 is preferred over the time associated with the client device 103 due to various factors such as, for example, clock skew, different time zones, or user alterations to the client device clock. By relying on the clock associated with the time-window zone management system 112, the time-window zone management system 112 can provide centralized management of the location-based active zones and increase reliability in determining the active status of a location-based active zone 101.

At box 809, the time-window zone management system 112 determines whether to notify the provider device of the event. The time-window zone management system 112 may notify the provider device 115 (FIG. 2) when the location-based service zone 101 is active and refrain from notifying the provider device 115 when the location-based service zone 101 is inactive. The active status of a particular location-based service zone 101 can be based at least in part on a time associated with receiving the trigger event notification from the client device, client device settings (e.g., whether the client device 103 is opted-in with the service associated with the location-based service zone), user account settings, parameters associated with the location-based service zone 101 (e.g., active time periods, targeted for specific users or multiple users, updates to geofence coordinates, etc.), a clock associated with the computing environment 203, and/or other factors as can be appreciated.

If the device is determined to be active, the time-window zone management system 112 proceeds to box 812. Otherwise, the time-window zone management system 112 proceeds to box 815. At box 812, the time-window zone management system 112 sends a provider notification 124 (FIG. 1B) to the provider device 115. The provider notification 124 can be in the form of a push notification and/or any other appropriate notification. After sending the provider notification 124 to the provider device 115, the time-window zone management system 112 ends. At box 815, the time-window zone management system 112 sends a notification to the client device 103 indicating that the location-based service zone 101 being monitored by the client device 103 is in a stale state. As such, the client device 103 may be configured to remove the geofence information associated with the location-based service zone 101 and to cease monitoring of the location-based service zone 101.

Figure 9:
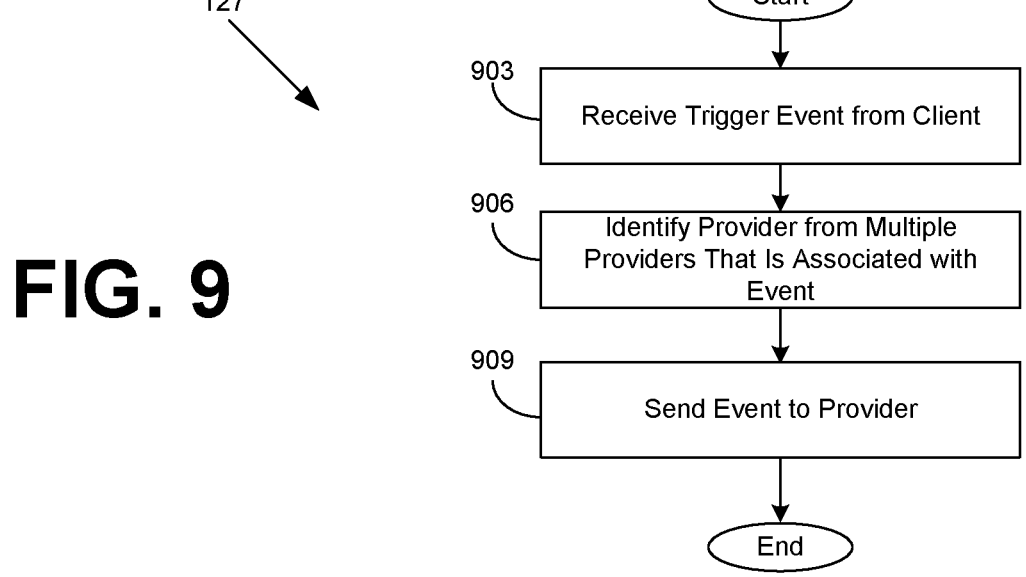
FIG. 9 is a flowchart illustrating one example of functionality implemented as portions of a multi-provider management system executed in a computing environment in the networked environment of FIG. 2 according to various embodiments of the present disclosure.

Referring next to FIG. 9, shown is a flowchart that provides one example of the operation of a portion of the multi-provider management system 127 according to various embodiments. It is understood that the flowchart of FIG. 9 provides merely an example of the many different types of functional arrangements that may be employed to implement the operation of the portion of the multi-provider management system 127 as described herein. As an alternative, the flowchart of FIG. 9 may be viewed as depicting an example of elements of a method implemented in the computing environment 203 (FIG. 2) according to one or more embodiments.

FIG. 9 provides a non-limiting example of the functionality that may be performed by the multi-provider management system 127 with respect to identifying the correct provider from multiple providers that is associated with a trigger event relative to a location-based service zone 101 (FIG. 2) received from a client device 103 (FIG. 2) according to various embodiments of the present disclosure.

Beginning with box 903, the multi-provider management system 127 receives a trigger event notification 117 (FIG. 2) associated with a location-based service zone 101 from the client device 103. In some embodiments, if the location-based service zone 101 were a geofence 106 (FIG. 2), the trigger event notification 117 may relate to a trigger event caused by the client device 103 passing through the boundary defined by the geofence parameters 244 (FIG. 2). In other embodiments, if the location-based service zone 101 were a beacon 109 (FIG. 2), the trigger event notification 117 may correspond to the client device 103 receiving the wireless signal being broadcasted by the beacon 109.

At box 906, the multi-provider management system 127 identifies the provider associated with the trigger event. According to various embodiments, the multi-provider management system 127 may identify the provider based in part on a token identifier for the location-based service zone 101 associated with the triggered event. The token identifier represents a unique identifier assigned to a particular location-based service zone 101. The multi-provider management system 127 may relate the token identifier with the provider identifier 241 associated with the provider of the location-based service zone 101. For example, the multi-provider management system 127 may access a registry that specifies associations between token identifiers and provider identifiers 241.

The token identifier may have been included in the parameter information received with the location-based service zone 101 at the time that the client device 103 received information about the location-based service zone 101 for monitoring. While the client device 103 may remain unaware of the actual identity of the provider, the client device 103 can relate the token identifier with the location-based service zone 101 and include the token identifier with the trigger event notification 117.

At box 909, the multi-provider management system 127 sends a provider notification 124 (FIG. 2) to the provider device 115 (FIG. 2). The provider notification 124 can be in the form of a push notification and/or any other appropriate notification. After sending the provider notification 124 to the provider device 115, this portion of the multi-provider management system 127 ends.

Figure 10:
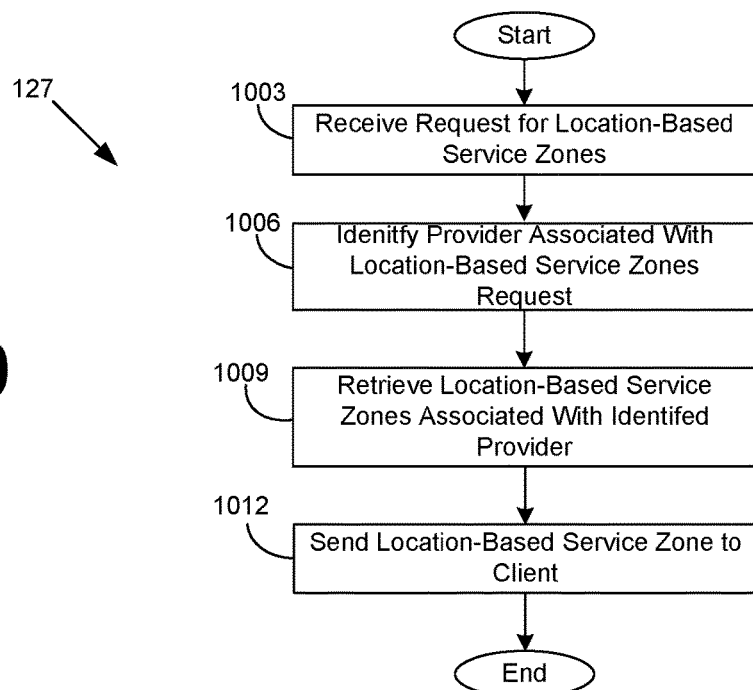
FIG. 10 is a flowchart illustrating one example of functionality implemented as portions of a multi-provider management system executed in a computing environment in the networked environment of FIG. 2 according to various embodiments of the present disclosure.

Referring next to FIG. 10, shown is a flowchart that provides one example of the operation of a portion of the multi-provider management system 127 according to various embodiments. It is understood that the flowchart of FIG. 10 provides merely an example of the many different types of functional arrangements that may be employed to implement the operation of the portion of the multi-provider management system 127 as described herein. As an alternative, the flowchart of FIG. 10 may be viewed as depicting an example of elements of a method implemented in the computing environment 203 (FIG. 2) according to one or more embodiments.

FIG. 10 provides a non-limiting example of the functionality that may be performed by the multi-provider management system 127 with respect to providing a client device 103 (FIG. 2) provider-specified location-based service zones 101 according to various embodiments of the present disclosure.

Beginning with box 1003, the multi-provider management system 127 receives a request from the client device 103 for at least one location-based service zone 101 (FIG. 2). In some embodiments, the client device 103 sends the request as a pull notification and/or other client-initiated request. In other embodiments, the client device 103 may be configured to send the request in response to receiving a push notification (e.g., silent or non-silent push notification) from the multi-provider management system 127. In some embodiments, the request may be for an updated location-based service zone 101. In some embodiments, the request may ask for location-based service zones 101 associated with a specific provider.

At box 1006, the multi-provider management system 127 may identifies the provider associated with the request based in part on a token identifier of the location-based service zone 101 that included in the request. For example, the multi-provider management system 127 may be able to compare the token identifier to a list of token identifiers associated with a particular provider identifier 241. The provider identifier 241 represents the unique identifier assigned to each provider with respect to managing location-based service zones 101.

At box 1009, the multi-provider management system 127 retrieves location-based service zones 101 associated with the identified provider. In some embodiments, the multi-provider management system 127 retrieves the location-based service zones 101 associated with the identified provider from a database in the data store 209 that stores the location-based service zones 101 for multiple providers. In other embodiments, the multi-provider management system 127 may poll the respective provider device 115 (FIG. 2) requesting location-based service zones 101.

At box 1012, the multi-provider management system 127 sends data encoded with the identification of and parameters for the location-based service zones 101 associated with the request. After sending the data to the client device 103, this portion of the multi-provider management system 127 ends.

Figure 11:
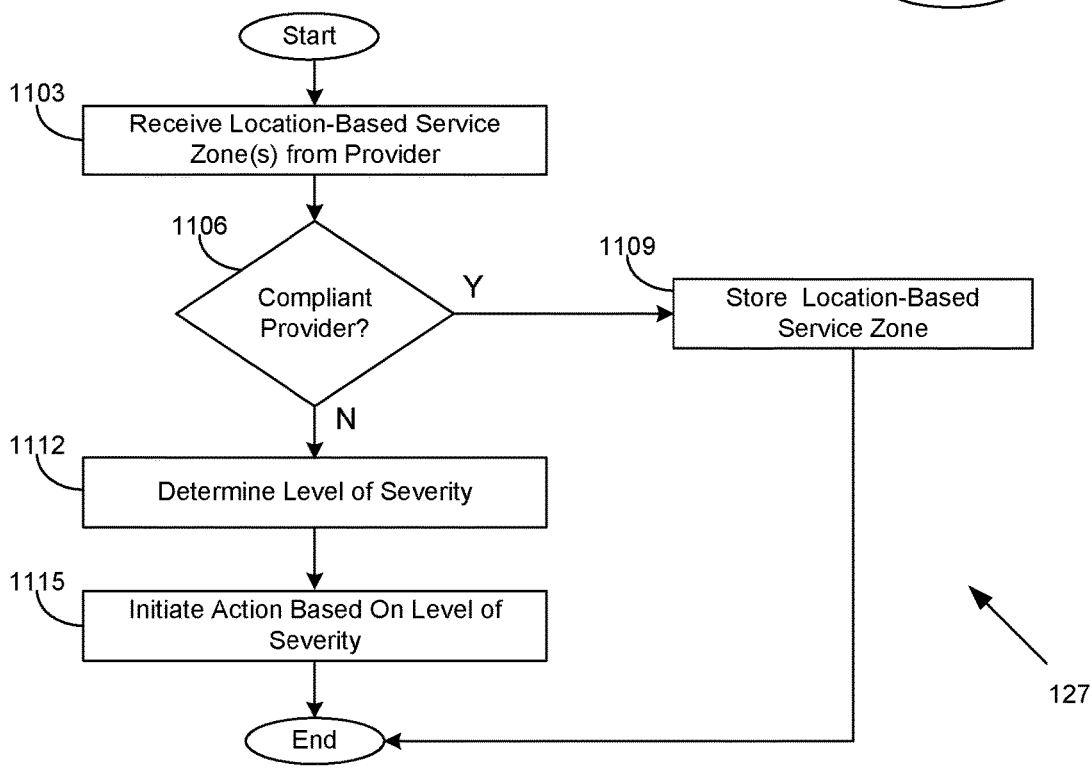
FIG. 11 is a flowchart illustrating one example of functionality implemented as portions of a multi-provider management system executed in a computing environment in the networked environment of FIG. 2 according to various embodiments of the present disclosure.

Referring next to FIG. 11, shown is a flowchart that provides one example of the operation of a portion of the multi-provider management system 127 according to various embodiments. It is understood that the flowchart of FIG. 11 provides merely an example of the many different types of functional arrangements that may be employed to implement the operation of the portion of the multi-provider management system 127 as described herein. As an alternative, the flowchart of FIG. 11 may be viewed as depicting an example of elements of a method implemented in the computing environment 203 (FIG. 2) according to one or more embodiments.

FIG. 11 provides a non-limiting example of the functionality that may be performed by the multi-provider management system 127 with respect to detecting abuse and/or noncompliance among providers according to various embodiments of the present disclosure.

Beginning with box 1103, the multi-provider management system 127 receives one or more location-bases service zones 101 from a provider device 115 (FIG. 2) associated with a particular provider. In some embodiments, the client device 103 may be configured to send the location-based service zones 101 in response to receiving a push notification (e.g., silent or non-silent push notification) from the multi-provider management system 127. In other embodiments, the provider device 115 may send the location-based service zones 101 in response to creating the location-based service zones 101. In other embodiments, the provider device 115 may send the location-based service zones 101 periodically and/or in response to an update to a location-based service zones 101.

At box 1106, the multi-provider management system 127 determines whether the provider associated with the received location-based service zones 101 is compliant with respect to the compliance rules 224 (FIG. 2). The compliance rules 224 may be based on, for example, a number of location-based service zones 101 associated with the provider, time restrictions associated with the location-based service zones 101, spacing requirements between one or more location-based service zones 101, types of location-based service zones 101 that are allowed or restricted (e.g., single user-targeted location-based service zones 101, multi-user targeted coverage location-based service zones 101, time-window location-based service zones 101), a misconfiguration of a location-based service zone, and/or any other type of compliance factor as can be appreciated. For example, if the compliance rules 224 indicate that each provider should only be associated with thirty (30) different location-based service zones 101 and the multi-provider management system 127 detects that the provider is associated with fifty (50) different location-based service zones 101, the multi-provider management system 127 may determine that the provider is noncompliant. In some scenarios, the excess number of location-based service zones 101 may indicate spamming.

In another non-limiting example, the compliance rules 224 may indicate a spacing requirement between location-based service zones 101. For example, the compliance rules 224 may indicate that there must be a 1 km separation between two location-based service zones 101 for a particular provider. As such, if the multi-provider management system 127 detects that the location-based service zones 101 violate the spacing requirement, the multi-provider management system 127 may determine that the provider is being noncompliant. If the multi-provider management system 127 determines that the provider is compliant, the multi-provider management system 127 may proceed to box 1109 and store the location-based service zone 101 in a database relative to the provider. After storing the location-based service zone 101, this portion of the multi-provider management system 127 ends.

If the multi-provider management system 127 determines that the provider is non-compliant, the multi-provider management system 127 proceeds to box 1112. At box 1112, the multi-provider management system 127 determines a level of severity associated with the noncompliance by the provider. The level of severity may be defined by the compliance rules 224 according to the type of non-compliance detected. In some embodiments, the level of severity may be based according to a particular violation of the compliance rules and/or a number of violations detected. For example, each type of compliance violation may be assigned a weight of severity (e.g., misconfiguration of geofence may be assigned a one and spamming may be assigned a five). In some embodiments, the level of severity may be based in part on a sum of all the weights for each respective detected violation.

At box 1115, the multi-provider management system 127 initiates an action based on the level of severity. In some embodiments, the compliance rules 224 may comprise a list of actions that the multi-provider management system 127 could employ based on a detection of abuse and/or noncompliance. For example, the list of actions may comprise notifying client devices 103 monitoring location-based service zones 101 for that provider to remove any information associated with those location-based service zones 101, sending a notification to the provider of the abuse and/or noncompliance, sending a request to the provider to correct the abuse and/or noncompliance within a predetermined time, and/or any other appropriate action. After initiating the action based on the level of severity, the multi-provider management system 127 ends.

Figure 12:
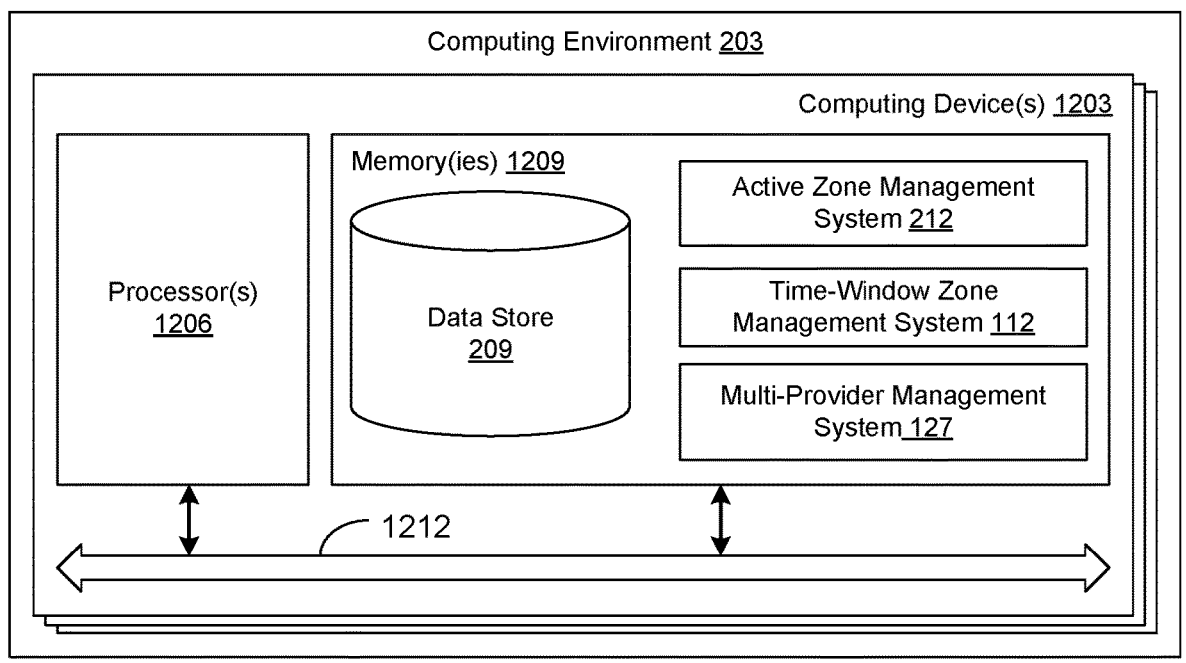
FIG. 12 is a schematic block diagram that provides one example illustration of a computing environment employed in the networked environment of FIG. 2 according to various embodiments of the present disclosure.

With reference to FIG. 12, shown is a schematic block diagram of the computing environment 203 according to an embodiment of the present disclosure. The computing environment 203 includes one or more computing devices 1203. Each computing device 1203 includes at least one processor circuit, for example, having a processor 1206 and a memory 1209, both of which are coupled to a local interface 1212. To this end, each computing device 1203 may comprise, for example, at least one server computer or like device. The local interface 1212 may comprise, for example, a data bus with an accompanying address/control bus or other bus structure as can be appreciated.

Stored in the memory 1209 are both data and several components that are executable by the processor 1206. In particular, stored in the memory 1209 and executable by the processor 1206 are the active zone management system 212, the time-window zone management system 112, the multi-provider management system 127, and potentially other applications. Also stored in the memory 1209 may be a data store 209 and other data. In addition, an operating system may be stored in the memory 1209 and executable by the processor 1206.

It is understood that there may be other applications that are stored in the memory 1209 and are executable by the processor 1206 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1209 and are executable by the processor 1206. In this respect, the term "executable" means a program file that is in a form that can ultimately be run by the processor 1206. Examples of executable programs may be, for example, a compiled program that can be translated into machine code in a format that can be loaded into a random access portion of the memory 1209 and run by the processor 1206, source code that may be expressed in proper format such as object code that is capable of being loaded into a random access portion of the memory 1209 and executed by the processor 1206, or source code that may be interpreted by another executable program to generate instructions in a random access portion of the memory 1209 to be executed by the processor 1206, etc. An executable program may be stored in any portion or component of the memory 1209 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1209 is defined herein as including both volatile and nonvolatile memory and data storage components. Volatile components are those that do not retain data values upon loss of power. Nonvolatile components are those that retain data upon a loss of power. Thus, the memory 1209 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1206 may represent multiple processors 1206 and/or multiple processor cores and the memory 1209 may represent multiple memories 1209 that operate in parallel processing circuits, respectively. In such a case, the local interface 1212 may be an appropriate network that facilitates communication between any two of the multiple processors 1206, between any processor 1206 and any of the memories 1209, or between any two of the memories 1209, etc. The local interface 1212 may comprise additional systems designed to coordinate this communication, including, for example, performing load balancing. The processor 1206 may be of electrical or of some other available construction.

Although the active zone management system 212, the time-window zone management system 112, the multi-provider management system 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-13 show the functionality and operation of an implementation of portions of the active zone management system 212, the time-window zone management system 112, the multi-provider management system 127, and/or the client application 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1206 in a computer system or other system. The machine code may be converted from the source code, etc. If embodied in hardware, each block may represent a circuit or a number of interconnected circuits to implement the specified logical function(s).

Although the flowcharts of FIGS. 3-13 show a specific order of execution, it is understood that the order of execution may differ from that which is depicted. For example, the order of execution of two or more blocks may be scrambled relative to the order shown. Also, two or more blocks shown in succession in FIGS. 3-13 may be executed concurrently or with partial concurrence. Further, in some embodiments, one or more of the blocks shown in FIGS. 3-13 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the active zone management system 212, the time-window zone management system 112, and the multi-provider management system 127, that comprises software or code can be embodied in any non-transitory computer-readable medium for use by or in connection with an instruction execution system such as, for example, a processor 1206 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the active zone management system 212, the time-window zone management system 112, and the multi-provider management system 127, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1203, or in multiple computing devices 1203 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device; and
at least one application executable in the at least one computing device, wherein when executed the at least one application causes the at least one computing device to at least:
receive, from a client device, a first trigger event notification of a first trigger event associated with a location-based service zone monitored by the client device, the location-based service zone being active during a first time period and being inactive during a second time period, and the location-based service zone defining an area in which a user can experience a service associated with a provider device;
determine that the client device is opted-in with the service;
compare a timestamp associated with receipt of the first trigger event notification with the first time period to determine whether the location-based service zone was active when the first trigger event occurred;
in response to the location-based service zone being active when the first trigger event occurred, notify the provider device associated with the location-based service zone of an occurrence of the first trigger event;
receive, from the client device, a second trigger event notification of a second trigger event associated with the location-based service zone;
determine that the location-based service zone was inactive based at least in part on the second time period;
in response to the location-based service zone being inactive when the second trigger event occurred, notify the client device to remove monitoring of the location-based service zone; and
in response to the location-based service zone being inactive when the second trigger event occurred, determine to refrain from notifying the provider device of an occurrence of the second trigger event.

2. The system of claim 1, wherein, when executed, the at least one application further causes the at least one computing device to at least send data encoding the location-based service zone to the client device.

3. The system of claim 1, wherein, when executed, the at least one application further causes the at least one computing device to at least generate the timestamp.

4. The system of claim 1, wherein notifying the provider device associated with the location-based service zone of the occurrence of the first trigger event further comprises sending the provider device a notification to prepare items for pickup.

5. The system of claim 1, wherein the location-based service zone defines a boundary surrounding a location associated with the provider device.

6. The system of claim 5, wherein the occurrence of the first trigger event relates to the client device passing through the boundary.

7. A method, comprising:
  receiving, via at least one computing device and from a client device, a first trigger event notification associated with a location-based service zone, the location-based service zone defining an area in which a user can experience a service associated with a provider device;
  determining, via the at least one computing device, that the client device is opted-in with the service;
  generating, via the at least one computing device, a timestamp associated with receipt of the first trigger event notification;
  in an instance in which the timestamp indicates the first trigger event notification was received from the client device during a first time period when the location-based service zone is active, notifying, via the at least one computing device, the provider device associated with the location-based service zone of an occurrence of a trigger event;
  receiving, via the at least one computing device and from the client device, a second trigger event notification associated with the location-based service zone;
  in response to the second trigger event notification being received from the client device during a second time period when the location-based service zone was inactive, notifying, via the at least one computing device, the client device that the location-based service zone is in a stale state; and
  in response to the second trigger event notification being received from the client device during the second time period when the location-based service zone was inactive, determining to refrain from notifying the provider device of an occurrence of a second trimer event.

8. The method of claim 7, wherein notifying the provider device of the occurrence of the trigger event comprises sending the provider device a notification to prepare items for pickup.

9. The method of claim 7, wherein notifying the client device associated with the first trigger event notification comprises the at least one computing device sending at least one of: a pull notification or a push notification.

10. The method of claim 7, wherein the location-based service zone being active is based at least in part on determining, via the at least one computing device, that the provider device is located in the location-based service zone.

11. The method of claim 7, wherein the location-based service zone defines a boundary surrounding a location associated with the provider device.

12. The method of claim 11, wherein the occurrence of the trigger event relates to the client device passing through the boundary.

13. The method of claim 7, wherein notifying the client device that the location-based service zone is in the stale state further comprises sending, via the at least one computing device, a notification to the client device requesting that the client device remove information related to the location-based service zone.

14. The method of claim 13, wherein the notification requesting that the client device remove the information related to the location-based service zone comprises a silent push notification or a non-silent push notification.

15. A system, comprising:
  at least one computing device; and
  at least one application executable in the at least one computing device, wherein when executed the at least one application causes the at least one computing device to at least:
    receive, from a client device, a trigger event notification associated with a location-based service zone, the location-based service zone defining an area in which a user can experience a service associated with a provider device;
    determine that the client device is opted-in with the service;
    generate a timestamp associated with receipt of the trigger event notification;
    in an instance in which the timestamp indicates the trigger event notification was received from the client device during a first time period when the location-based service zone is active, notify the provider device associated with the location-based service zone of an occurrence of a trigger event;
    receive, from the client device, a second trigger event notification associated with the location-based service zone;
    in response to the second trigger event notification being received from the client device when the location-based service zone was inactive, notify the client device to remove monitoring of the location-based service zone; and
    in response to the second trigger event notification being received form the client device when the location-based service zone was inactive, determine to refrain from notifying the provider device of an occurrence of a second trigger event.

16. The system of claim 15, wherein the location-based service zone is associated with at least one of a geofence or a beacon.

17. The system of claim 15, wherein, when executed, the at least one application further causes the at least one computing device to identify at least one of a plurality of geofences or beacons within the location-based service zone.

18. The system of claim 15, wherein the timestamp is according to a clock of the at least one computing device.

19. The system of claim 15, wherein the location-based service zone is associated with provider data that identifies the service.

20. The system of claim 15, wherein notifying the provider device associated with the location-based service zone of an occurrence of a trigger event further comprises sending the provider device a notification to prepare items for pickup.

* * * * *